(12) United States Patent
Sasaki

(10) Patent No.: US 8,117,923 B2
(45) Date of Patent: Feb. 21, 2012

(54) BICYCLE BOTTOM BRACKET FORCE SENSOR

(75) Inventor: Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 323 days.

(21) Appl. No.: 12/463,154

(22) Filed: May 8, 2009

(65) Prior Publication Data

US 2010/0282001 A1 Nov. 11, 2010

(51) Int. Cl.
*G01L 5/12* (2006.01)
(52) U.S. Cl. .................................... 73/862.49
(58) Field of Classification Search ............... 73/862.49
See application file for complete search history.

(56) References Cited

U.S. PATENT DOCUMENTS

| | | | |
|---|---|---|---|
| 3,578,829 A * | 5/1971 | Hata et al. | 384/458 |
| 4,112,751 A | 9/1978 | Grunbaum | |
| 4,145,919 A | 3/1979 | Bauer et al. | |
| 4,341,122 A | 7/1982 | Lechler et al. | |
| 5,140,849 A | 8/1992 | Fujita et al. | |
| 5,758,736 A * | 6/1998 | Yamauchi | 180/220 |
| 5,952,587 A | 9/1999 | Rhodes et al. | |
| 6,196,347 B1 * | 3/2001 | Chao et al. | 180/206 |
| 6,269,702 B1 | 8/2001 | Lambson | |
| 6,490,935 B1 | 12/2002 | Joki et al. | |
| 6,644,135 B1 | 11/2003 | Kishimoto et al. | |
| 6,920,801 B2 | 7/2005 | Van Leeuwen et al. | |
| 6,988,427 B2 | 1/2006 | Yamanaka | |
| 7,009,387 B2 * | 3/2006 | Guderzo | 324/207.2 |
| 7,516,677 B2 | 4/2009 | Watarai et al. | |
| 7,806,006 B2 * | 10/2010 | Phillips et al. | 73/862.338 |
| 7,861,599 B2 * | 1/2011 | Meggiolan | 73/794 |
| 2003/0097900 A1 | 5/2003 | Yamanaka | |

FOREIGN PATENT DOCUMENTS

| | | |
|---|---|---|
| DE | 196 46 979 A1 | 9/1998 |
| EP | 1 361 822 B1 | 5/2008 |
| EP | 1 942 050 A1 | 7/2008 |
| JP | H11-258078 A | 9/1999 |

OTHER PUBLICATIONS

European Search Report of corresponding EP Application No. 09 17 1257.0 dated Sep. 16, 2011.

* cited by examiner

*Primary Examiner* — Lisa Caputo
*Assistant Examiner* — Octavia Davis
(74) *Attorney, Agent, or Firm* — Global IP Counselors, LLP

(57) ABSTRACT

A bicycle bottom bracket force sensor includes an outer portion, an inner portion, at least one sensor mounting surface and a strain gauge. The inner portion is dimensioned to receive and support a crank axle bearing that rotatably supports a crank axle. The at least one sensor mounting surface extends between the outer portion and the inner portion has the strain gauge fixed thereto. The sensor mounting surface extends in a direction substantially perpendicular to a rotation axis of the crank axle when the force sensor is coupled to the bicycle bottom bracket.

18 Claims, 15 Drawing Sheets

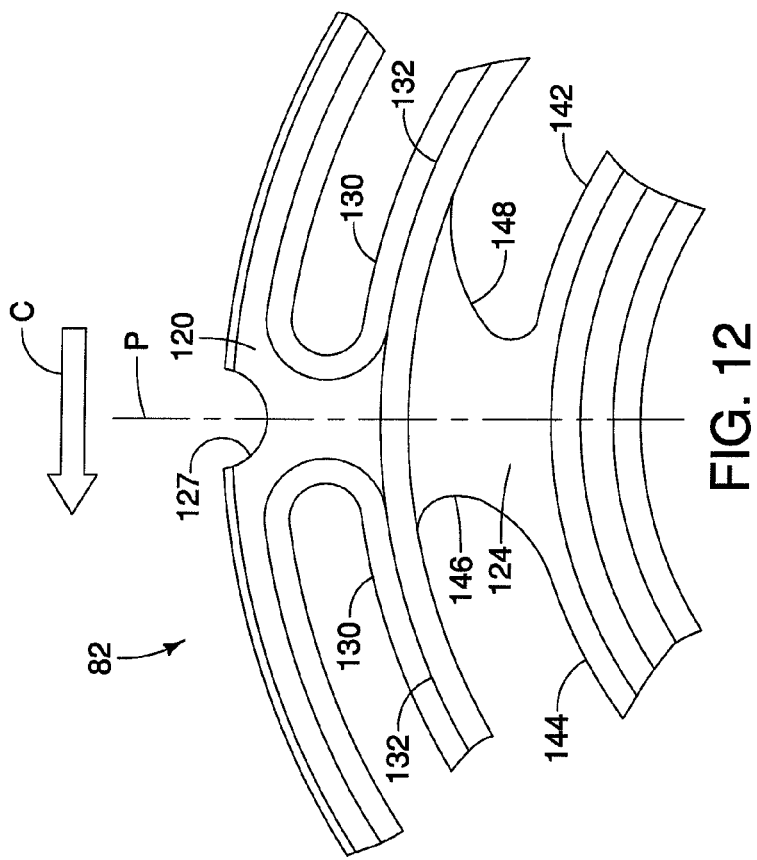
FIG. 12
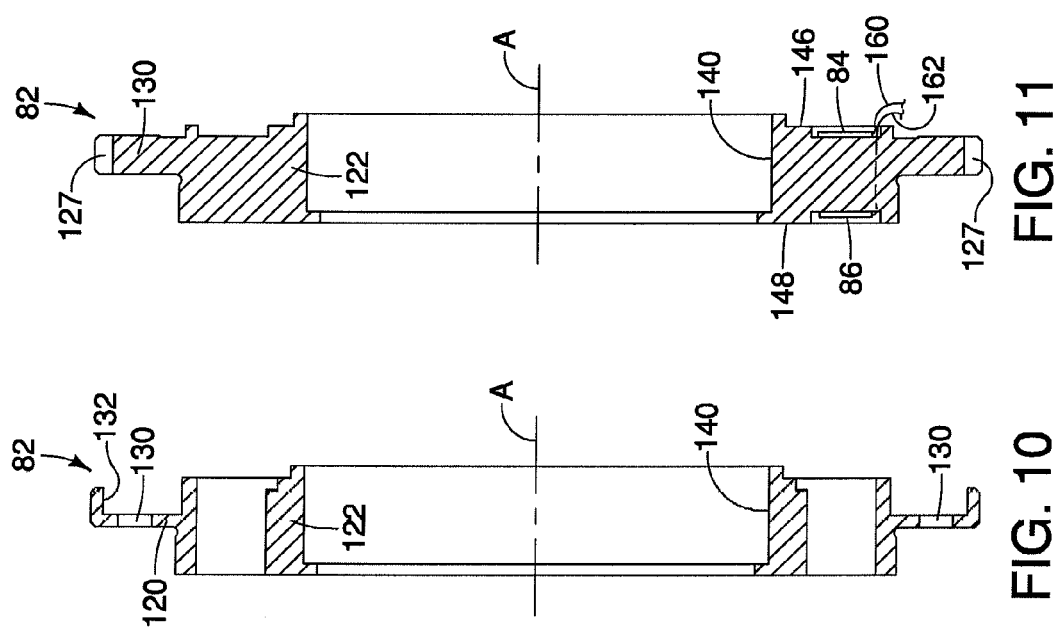
FIG. 11
FIG. 10

US 8,117,923 B2

BICYCLE BOTTOM BRACKET FORCE SENSOR

BACKGROUND OF THE INVENTION

1. Field of the Invention

This invention generally relates to a force sensor for a bicycle. More specifically, the present invention relates to force sensor that mounts to an outer side of a bottom bracket of a bicycle that is used to calculate at least one of power applied to bicycle pedals and torque applied to a crank axle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, bicycles have been provided with cycle computers to inform the rider of various traveling conditions of the bicycle.

Bicycles are sometimes equipped with a force sensor (e.g., a torque-detecting device) for detecting force acting on the bicycle crank axle. In U.S. Pat. No. 7,516,677, issued Apr. 14, 2009 (assigned to Shimano Inc.), a cylindrical torsion-detecting sleeve member (force sensor unit) is provided on a crank axle for detecting a torque applied to the crank axle. In this arrangement, the sensor(s) are mounted to the sleeve member and the sleeve member is installed within the bottom bracket tube. However, this arrangement is complex and requires complete disassembly of the front crank assembly in order to install the force sensor.

In EP 1,361,822, sensors are positioned between a radial inner surface of the bottom bracket tube and a radially extending outer surface of an annular member that surrounds one of the crank axle bearings. One of the problems with this arrangement is that the sensor is exposed on the radially extending outer surface of the annular member prior to installation and can be damaged during the process of installing the annular member to the bottom bracket tube.

In view of the above, it will be apparent to those skilled in the art from this disclosure that there exists a need for an improved crank axle force sensor arrangement that can be easily installed to the bottom bracket tube of the bicycle. This invention addresses this need in the art as well as other needs, which will become apparent to those skilled in the art from this disclosure.

SUMMARY OF THE INVENTION

One object of the present invention is to provide a force sensor assembly that is easily installed and removed from a bicycle.

Another object of the present invention is to provide a force sensor assembly with force sensors that are protected within recessed protected by a cover of the force sensor assembly prior to installation to a bicycle.

The foregoing objects can basically be attained by providing a bicycle bottom bracket force sensor to a bicycle. The bicycle bottom bracket force sensor includes an outer portion, an inner portion, at least one sensor mounting surface and a strain gauge. The inner portion is dimensioned to receive and support a crank axle bearing that rotatably supports a crank axle. The at least one sensor mounting surface extends between the outer portion and the inner portion has the strain gauge fixed thereto. The sensor mounting surface extends in a direction substantially perpendicular to a rotation axis of the crank axle when the force sensor is coupled to the bicycle bottom bracket.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a cross-sectional view of the main body of the force sensor taken along the lines 10-10 in FIG. 9, in accordance with the present invention;

FIG. 11 is another cross-sectional view of the main body of the force sensor taken along the lines 11-11 in FIG. 9, in accordance with the present invention;

FIG. 12 is an enlarged outer end view of the main body of the force sensor showing details of the first joining portion of the main body in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
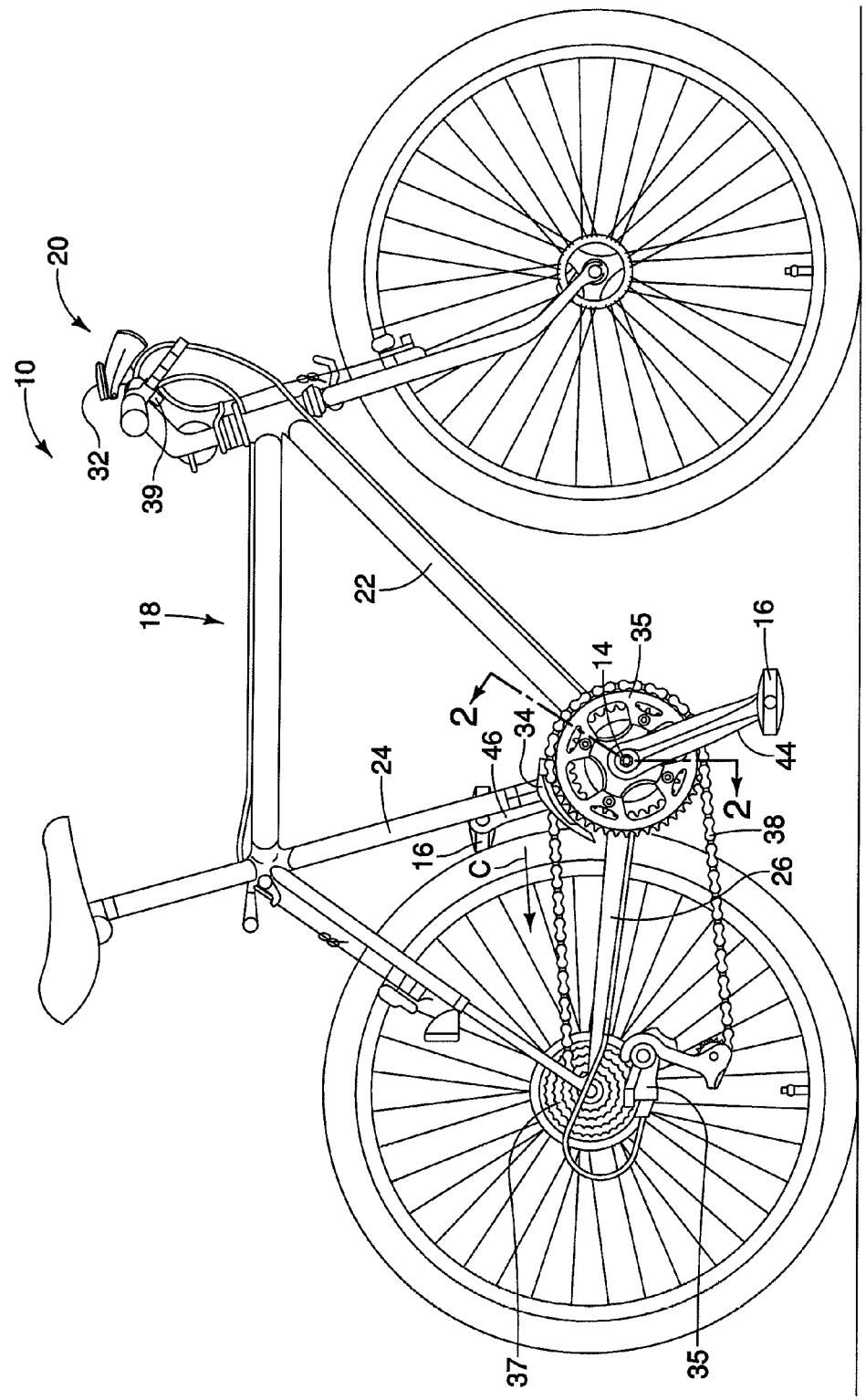
FIG. 1 is a side view of a bicycle showing a frame with a bottom bracket tube in accordance with the present invention.
Figure 2:
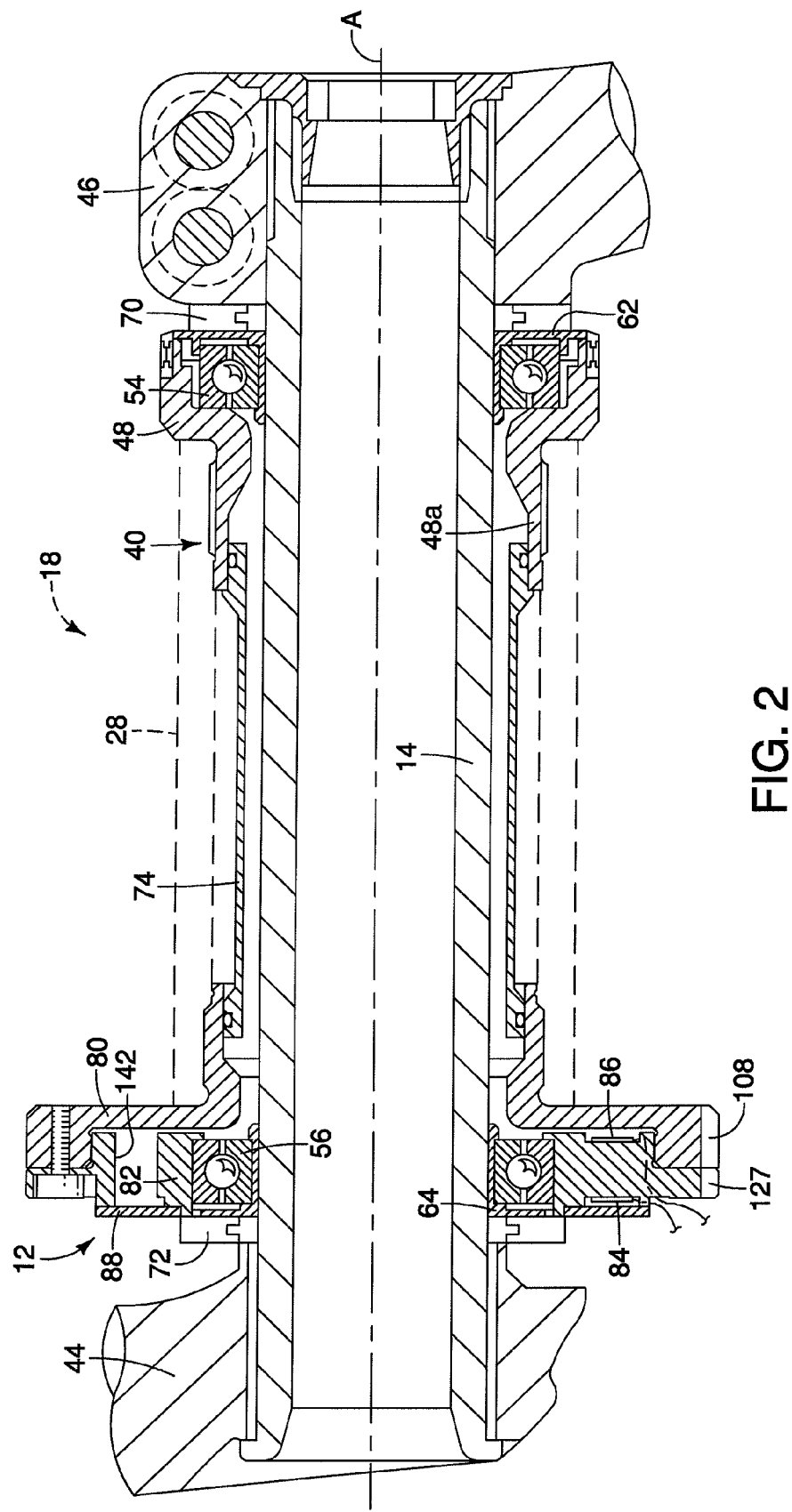
FIG. 2 is a cross-section of the bottom bracket tube of the bicycle taken along the line 2-2 in FIG. 1 showing details of a front crank assembly and a force sensor in accordance with the present invention;6
Figure 3:
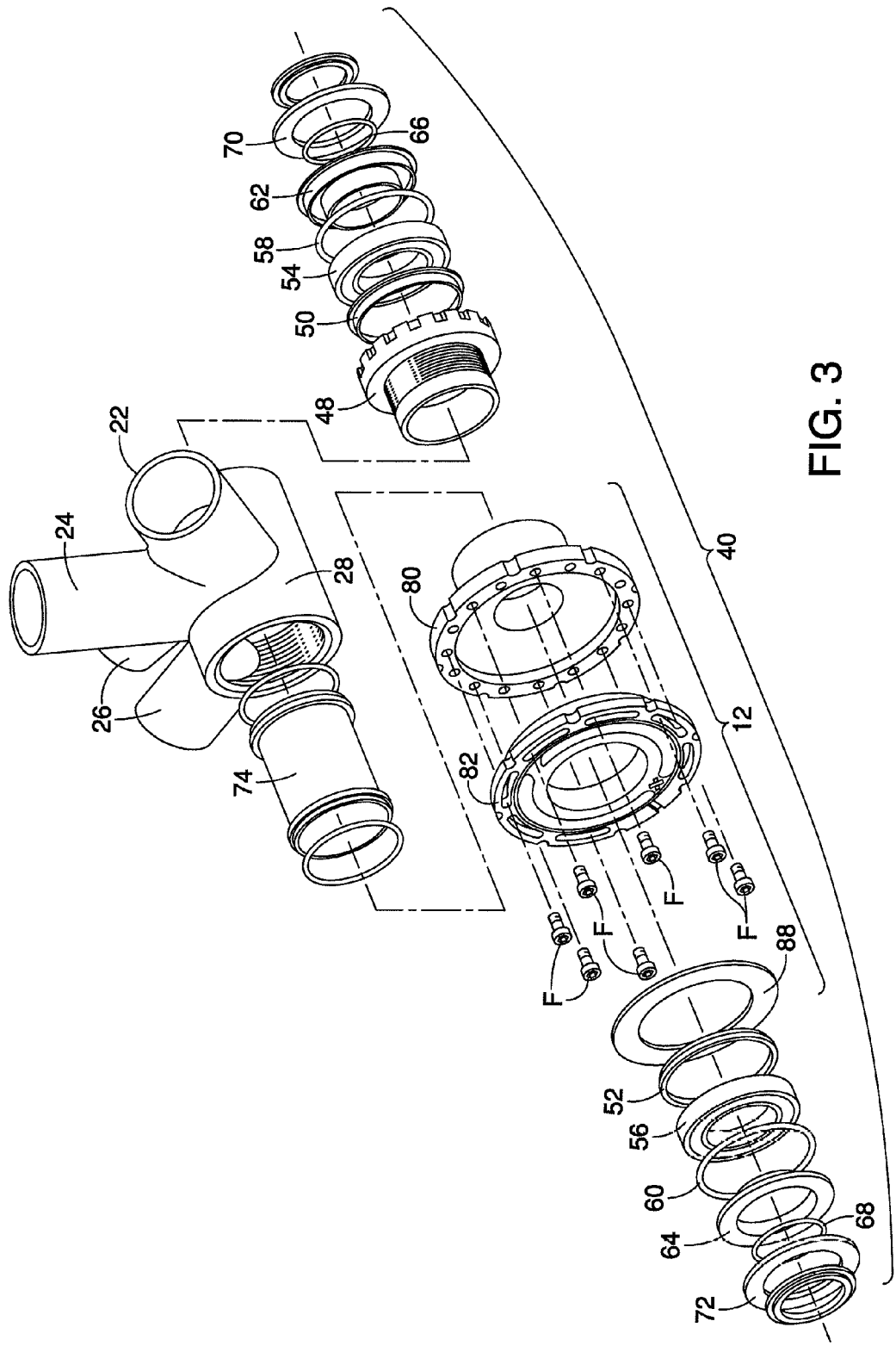
FIG. 3 is an exploded view of the front crank assembly showing details of the force sensor, such as an adaptor member, a main body and a cover of the force sensor in accordance with the present invention.

Referring initially to FIG. 1, a bicycle 10 that is illustrated in accordance with a first embodiment of the present invention. As shown in FIGS. 2 and 3, the bicycle 10 includes a force sensor assembly 12 that is configured to sense the force applied by a cyclist (not shown) on a crank axle 14 (shown in FIG. 2) as the cyclist applies force on a pair of bicycle pedals 16 (shown in FIG. 1) that are coupled to the crank axle 14. The bicycle pedals 16 include conventional binding devices configured to releasably retain cleats on cycling shoes (not shown) in a conventional manner. Specifically, when mating cycling shoes are retained by the bicycle pedals 16, rotary power produced by the cyclist (not shown) is transmitted from the cycling shoes to the bicycle pedals 16 during both downward cycling motion and upward cycling motion.

With specific reference to FIGS. 1, 2 and 3, a brief description of the bicycle 10 is provided. The bicycle 10 has a frame 18 and bicycle control devices 20.

The frame 18 includes a down tube 22 (FIGS. 1 and 3 only), a seat tube 24 (FIGS. 1 and 3 only), a pair of chain stays 26 (FIGS. 1 and 3 only) and a bottom bracket tube 28 (FIGS. 2 and 3 only). The down tube 22, the seat tube 24 and the pair of chain stays 26 are all fixed to the bottom bracket tube 28 in a conventional manner. For example, the frame 10 can be made of metallic tube sections welded together, or alternatively, can be made of composite materials such that the tubes of the frame 10 are fixed to one another by resin and/or carbon fiber materials. Since the frame 10 is a conventional feature of the bicycle 10, further description of the frame 10 is omitted for the sake of brevity.

The bottom bracket tube 28 is a hollow element with open ends. The bottom bracket tube 28 is sometimes referred to simply as a bottom bracket or as a hanger. The bottom bracket tube 28 is configured to support the crank axle 14 and elements associated with the crank axle 14, as described in greater detail below. Each of the open ends of the bottom bracket tube 28 preferably include internal machine threads that supports the force sensor assembly 12 in a manner described in greater detail below. Alternatively, each of the open ends of the bottom bracket tube 28 can be dimensioned without machine threads to receive crank axle supporting elements via a press-fit arrangement that 14.

As indicated in FIG. 1, the bicycle control devices 20 include (among other things) a control unit 32, a front derailleur 34, a set of chain rings 35, a rear derailleur 36, a rear sprocket set 37, a chain 38 that extends between the chain rings 35, the rear sprocket set 37, a rear gear shifting device 39, a front gear shifting device (hidden behind the rear gear shifting device 39 in FIG. 1) and the force sensor assembly 12 (shown in FIGS. 2 and 3). The control unit 32 is attached to a forward section of the frame 18, such as the handlebars. As described in greater detail below, the control unit 32 is configured to determine the torque being applied to the crank axle 14 using strain measurement signals provided by the force sensor assembly 12. A description of the control unit 32 is proved below after a description of the force sensor assembly 12.

The front derailleur 34 is attached to the seat tube 24 just above the bottom bracket tube 28 and the rear derailleur 36 is attached to one of the chain stays 26. The front derailleur 34 and the rear derailleur 36 are operated by respective ones of the front gear shifting device and the rear gear shifting device 39 in a conventional manner. The front derailleur 34, the rear derailleur 36, rear gear shifting device 39 and the front gear shifting device are conventional bicycle components. Therefore description of these components is omitted for the sake of brevity.

As best shown in FIG. 2, the bottom bracket tube 28 is configured to receive and support a front crank assembly 40. The front crank assembly 40 is configured and dimensioned to rotatably support the crank axle 14. As shown in FIGS. 1, 2 and 3, the front crank assembly 40 includes the crank axle 14 (FIGS. 1 and 2), a right crank 44 (FIGS. 1 and 2 only) detachably fixed to the right end of the crank axle 14, a left crank 46 (FIGS. 1 and 2 only) fixed to the left end of the crank axle 14, a adapter 48, bearing rings 50 and 52, bearings 54 and 56, seals 58 and 60, seal guards 62 and 64, O-ring seals 66 and 68, spacers 70 and 72 and a dust tube 74. The spacers 70 and 72 are optional elements of the front crank assembly 40 and are used to adjust the position of the crank axle 14 relative to the front crank assembly 40. A conventional front crank assembly, similar to the front crank assembly 40, such as that disclosed in U.S. Patent Application Publication No. 2003/0097900, published May 29, 2003, typically includes a pair of threaded adaptors, like the threaded adaptor 48. However, in the present invention, one of the threaded adaptors is removed and replaced with the force sensor assembly 12.

The crank axle 14 is a hollow cylindrical member that is rotatably mounted to extend through the bottom bracket tube 28, as shown in FIG. 2. The crank axle 14 is configured to rotate about a rotation axis A that extends through the center of the crank axle 14, the bearings 54 and 56 and the force sensor assembly 12, with the force sensor assembly 12 installed to the bottom bracket tube 28 the bearing 54 installed to the adaptor 48 and the bearing 56 installed to the force sensor assembly 12. The right crank 44 is fixed to the right side end of the crank axle 14 in a conventional manner. The left crank 46 is removably fixed to the left side end of the crank axle 14 in a conventional manner. The pedals 16 are attached to distal ends of respective ones of the right crank 44 and the left crank 46 in a conventional manner.

The adapter 48 is dimensioned to threadedly attach to the left side of the bottom bracket tube 28 in a conventional manner. The adapter 48 is configured to receive and support the bearing ring 50, the bearing 54, the seal 58, the seal guard 62 and the O-ring seal 66. The threaded adaptor 48 also includes an internal surface 48a that is dimensioned to form a seal with and support one end of the dust tube 74, as indicated in FIG. 2. Alternatively, the machine threads on the threaded adaptor 48 can be eliminated and the threaded adaptor 48 can be press-fitted to the bottom bracket tube 28.

A description of the force sensor assembly 12 is now provided with specific reference to FIGS. 2-17.

The force sensor assembly 12 basically includes an adaptor member 80, a main body 82, a first side strain gauge 84, a second side strain gauge 86 and a cover 88. As is described in greater detail below, the first side strain gauge 84 is an outer side strain gauge because with the adaptor 48 of the force sensor assembly 12 mounted to the bottom bracket tube 28, the first side strain gauge 84 is disposed on an outboard side of the main body 82 facing away from the bicycle 10. The second side strain gauge 86 is an inner side strain gauge because with the adaptor 48 of the force sensor assembly 12 mounted to the bottom bracket tube 28, the second side strain gauge 86 is disposed on an inboard side of the main body 82 facing the bottom bracket tube 28 of the bicycle 10.

Figure 6:
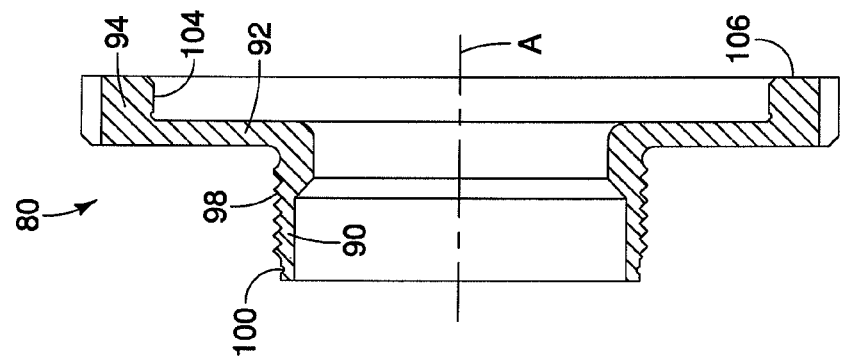
FIG. 6 is a cross-sectional view of the adaptor member of the force sensor shown with the main body and the cover removed in accordance with the present invention.
Figure 5:
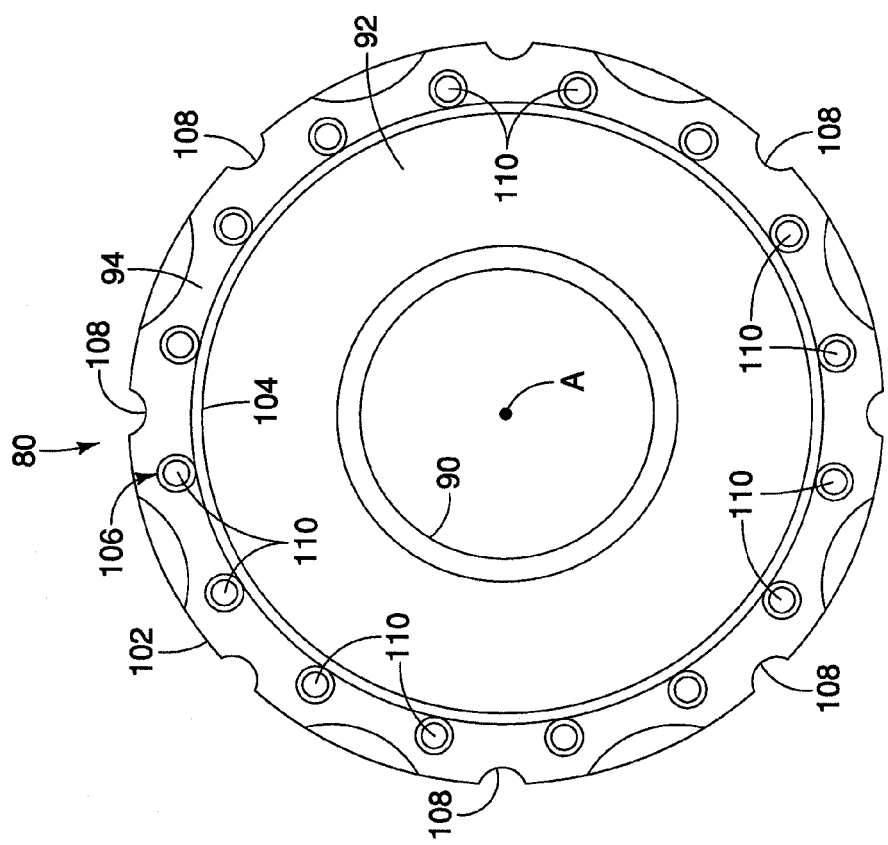
FIG. 5 is an end view of the adaptor member of the force sensor shown with the main body and the cover removed in accordance with the present invention.
Figure 4:
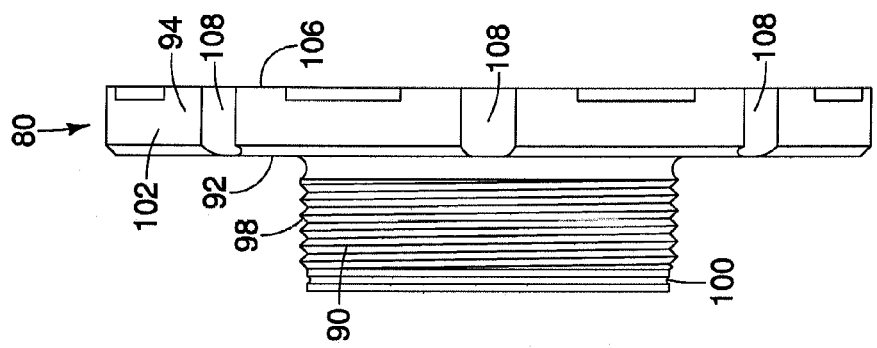
FIG. 4 is a side view of the adaptor member of the force sensor shown with the main body and the cover removed in accordance with the present invention.

A description of the adaptor member 80 is now provided with specific reference to FIGS. 4, 5 and 6. The adaptor member 80 supports the main body 82 in a radial direction relative to the rotation axis A and in directions parallel to the rotational axis A. As indicated in FIG. 3, the adaptor member 80 is installed to the bottom bracket tube 28 such that the force sensor assembly 12 is disposed between the bottom bracket tube 28 and the chain rings 35. However, the adaptor member 80 of the present invention differs from the conventional adaptor 48, as described below.

The adaptor member 80 basically includes an attachment portion 90, an annular shaped flange 92 and a sensor mounting portion 94. The adaptor member 80 is preferably made of a metallic material, such as steel, aluminum, titanium or a suitable alloy with appropriate rigidity and strength.

The attachment portion 90 has a tubular shape that includes machine threads 98 on an outer surface thereof and a seal lip 100 at a distal end. The machine threads 98 provide the attachment portion 90 with the means for removable attachment to the outboard side of the bottom bracket tube 28. Alternatively, the machine threads 98 can be omitted and the attachment portion 90 can be press-fitted to the outboard side of the bottom bracket tube 28. The seal lip 100 is configured to receive one end of the dust tube 74 and mate therewith thus creating a water tight seal between the dust tube 74 and the adaptor member 80, as indicated in FIGS. 2 and 3. The tubular portion 98 is hollow such that the crank axle 14 extends therethrough, as indicated in FIG. 2.

The annular shaped flange 92 extends radially outward from the tubular portion 98 of the attachment portion 90 joining the attachment portion 90 to the sensor mounting portion 94.

The sensor mounting portion 94 is an annular shaped section of the adaptor member 80 that has a circumferentially extending outer surface 102, a circumferentially extending inner surface 104 and an axial end face 106. The sensor mounting portion 94 extends outward away from the attachment portion 90 of the adaptor member 80 and outward from the bottom bracket tube 28 with the adaptor member 80 installed to the bottom bracket tube 28. Further, the sensor mounting portion 94 is dimensioned to removably receive and retain the main body 82, as described in greater detail below.

Figure 15:
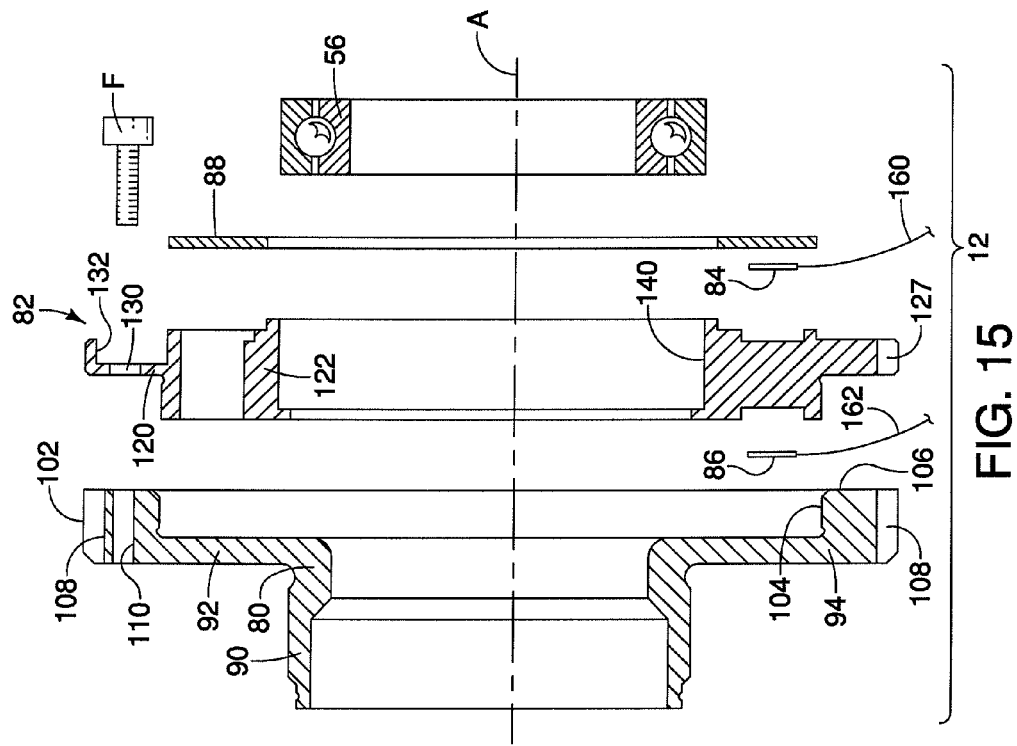
FIG. 15 is an exploded cross-sectional view of the force sensor also taken along the lines 14-14 in FIG. 13 showing the adaptor member, the main body, the strain gages and the cover in accordance with the present invention.
Figure 14:
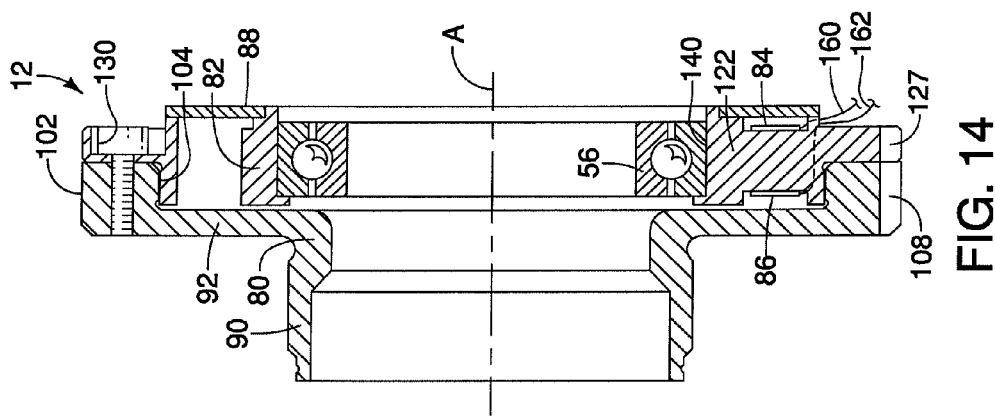
FIG. 14 is a cross-sectional view of the force sensor taken along the line 14-14 in FIG. 13, shown fully assembled with the cover fixed to the main body and the main body installed within the adaptor member in accordance with the present invention.

The outer surface 102 of the sensor mounting portion 94 includes a plurality of recesses 108 that are configured to assist in the installation and removal of the adaptor member 80 to and from the bottom bracket tube 28. As indicated in FIG. 15, the circumferentially extending inner surface 104 is dimensioned to receive the main body 82 such that the main body 82 is partially covered by the annular shaped flange 92 and the sensor mounting portion 94 within the interior space of the adaptor member 80 defined by the annular shaped flange 92 and the inner surface 104. The axial end face 106 includes a plurality of threaded apertures 110 that are circumferentially spaced apart from one another. The threaded apertures 110 are dimensioned to receive fasteners F that releasably fix the main body 82 to the adaptor member 80.

A description of the main body 82 is now provided with specific reference to FIGS. 7-15. The main body 82 includes an outer ring 120 (an outer portion), an inner ring 122 that is concentrically arranged within the outer ring 120, a first joining portion 124 and a second joining portion 126. The main body 82 is preferably made of a metallic material, such as steel, aluminum, titanium or a suitable alloy with appropriate rigidity and strength. The thickness and overall dimensions of the main body 82 are determined by the anticipated forces that will act on the crank axle 14, the materials used and the size and type of bicycle to be equipped with the force sensor assembly 12.

As shown in FIGS. 7-15, the outer ring 120 is an annular shaped portion of the main body 82 that is removably attachable to the adaptor member 80 in a manner described below. Since the adaptor member 80 is removably attachable to an outboard side of the bottom bracket tube 28, the outer ring 120 is removably couple-able to the outboard side of the bottom bracket tube 28.

The outer ring 120 includes a plurality of recesses 127, a first axial end face 128 and a second axial end face 129. The plurality of recesses 127 are dimensioned to correspond to the dimensions of the plurality of recesses 108 of the adaptor member 80. A plurality of arcuate elongated openings 130 are formed in the outer ring 120 that extend between the first and second axial end faces 128 and 129. The openings 130 are located at a diameter that coincides with the plurality of apertures 110 in the sensor mounting portion 94 of the adaptor member 80. As indicated in FIGS. 2, 3, 14 and 15, the fasteners F extend through corresponding ones of the arcuate elongated openings 130 and into the apertures 110 in order to releasably secure the main body 82 to the adaptor member 80. The arcuate elongated openings 130 have an arcuate length that is dimensioned to provide angular adjustment of the position of the outer ring 120 relative to the adaptor member 80. Specifically, the position of the outer ring 120 relative to the adaptor member 80 can be angularly adjusted with an overall range of approximately 35 degrees about the rotation axis A. Each of the arcuate elongated openings 130 is chamfered such that a recess 132 surrounds each of the arcuate elongated openings 130.

A section 134 of the outer ring 120 is solid having no opening formed therein. The section 134 is instead provided with a recess 136 that extends radially outward along the surface of the outer ring 120.

Figure 9:
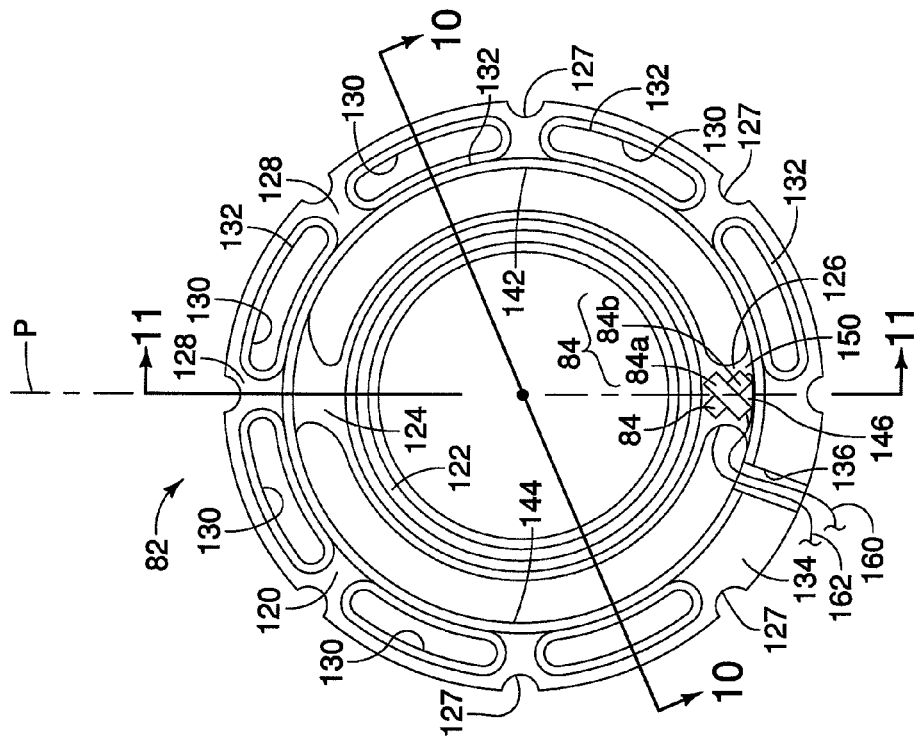
FIG. 9 is an outer end view of the main body of the force sensor shown removed from the adaptor member and with the cover removed exposing the other of the pair of strain gauges in accordance with the present invention.
Figure 8:
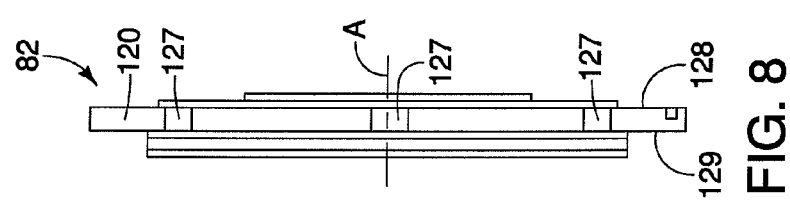
FIG. 8 is a side view of the main body of the force sensor shown removed from the adaptor member in accordance with the present invention.
Figure 7:
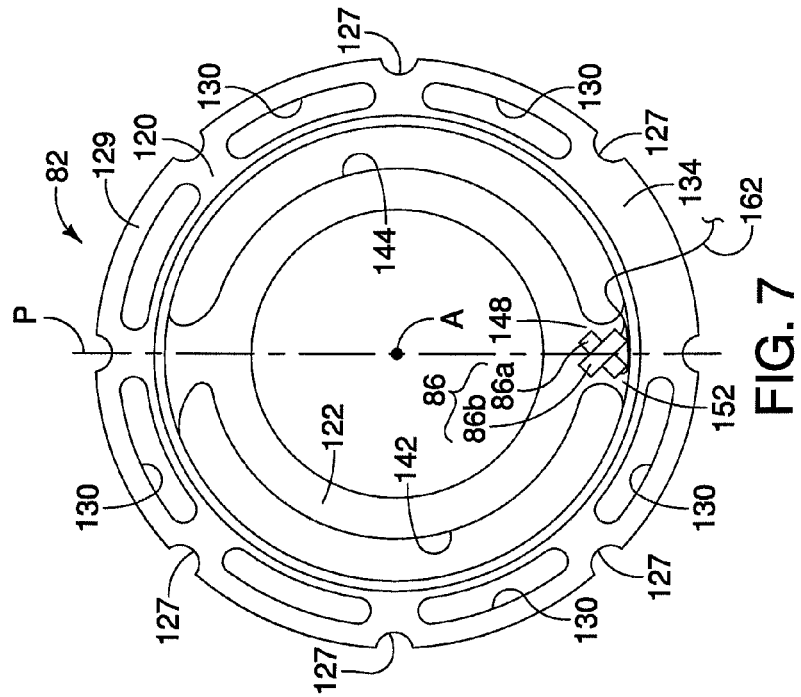
FIG. 7 is an inner end view of the main body of the force sensor shown removed from the adaptor member showing one of a pair of strain gauges, and showing an outer ring, an inner ring, a first joining portion and a second joining portion in accordance with the present invention.
Figure 13:
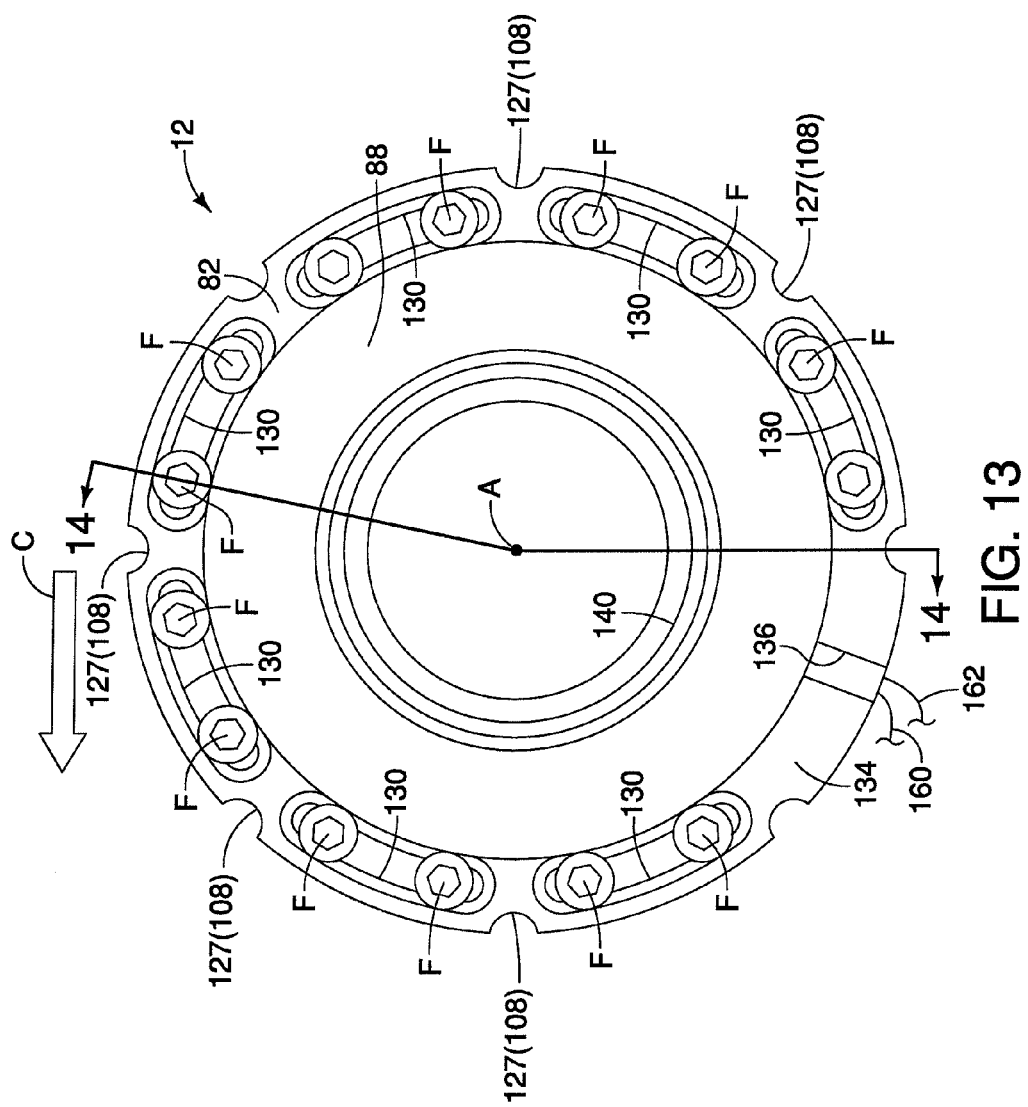
FIG. 13 is an outer end view of the force sensor shown fully assembled with fasteners fixing the main body to the adaptor member in accordance with the present invention.

The inner ring 122 is a crank axle bearing mounting portion that is concentrically arranged within the outer ring 120. The inner ring 122 is dimensioned to receive and support the bearing 56 (one of the crank axle bearings) that rotatably supports the crank axle 14. More specifically, the inner ring 122 has an inner surface 140 that extends circumferentially. The inner ring 122 is dimensioned to receive and retain the bearing 56 in a conventional manner, for example, in a press-fit engagement. Hence, inner ring 122 is radially spaced apart from the outer ring 120 (the outer portion) with a crank axle bearing mounting portion defined on an inner radial surface of the inner ring 122. Further, as is indicated in FIGS. 7, 9 and 10, the outer ring 120 encircles the inner ring 122, thus circumferentially surrounding the inner ring 122. In other words, the inner ring 122 is concentrically arranged within the outer ring 120.

As best shown in FIGS. 7 and 9, the outer ring 120 and the inner ring 122 of the main body 82 are spaced apart from one another in the radial direction and fixed to one another by the first joining portion 124 and the second joining portion 126. The first joining portion 124 extends in a radial direction between the inner ring 122 and the outer ring 120. The second joining portion 126 extends between the inner ring 122 and the outer ring 120 in a direction that is angularly offset from a plane P (see FIGS. 9 and 12) that coincides with and extends along the rotation axis A of the crank axle 14 with the adaptor member 80 installed to the bottom bracket tube 28. The plane P is also preferably a vertical plane (perpendicular to horizontal). Further, during installation of the force sensor assembly 12, the adaptor member 80 installed to the bottom bracket tube 28 such that the orientation of the first and second strain gauges 84 and 86 are oriented with respect to the plane P, as indicated in FIGS. 9, 16 and 17.

Specifically, the first joining portion 124 and the second joining portion 126 are circumferentially spaced apart from one another by approximately 180 degrees. As indicated in FIG. 9, the first joining portion 124 is located at a top section of the inner ring 122 (relative to the depiction in FIG. 9) and the second joining portion 126 is located at a bottom section of the inner ring 122 (relative to the depiction in FIG. 9). Elongated arcuate openings 142 and 144 are defined between the inner ring 122, the outer ring 120, the first joining portion 124 and the second joining portion 126, as best shown in FIGS. 7 and 9. The recess 136 in the section 134 of the outer ring 120 extends between the elongated arcuate opening 144 and a radial outer edge of the outer ring 120.

As shown in an enlarged scale in FIG. 12, the first joining portion 124 has a first circumferential side 146 and a second circumferential side 148. The first circumferential side 146 and the second circumferential side 148 are asymmetric relative to one another and to the plane P (FIGS. 9 and 12) that extends through the rotation axis A (FIG. 9). Specifically, relative to the plane P, the second circumferential side 148 is larger than the first circumferential side 146. An arrow representing a chain tension direction C is shown in FIGS. 12 and 15. The chain tension direction C represents the tension on the chain 38 during cycling. The arrow representing the chain tension direction C points from an upper region of the front crank assembly 40 toward the rear derailleur 36. Hence, the orientation and overall shape of the first joining portion 124 shown in FIG. 12 is important for optimizing the forces detected by the first and second strain gauges 84 and 86 on the second joining portion 126 (described in greater detail below). More specifically, the overall shape of the first joining portion 124 is provided to counter the tension on the chain 38 acting the chain tension direction C.

Figure 16:
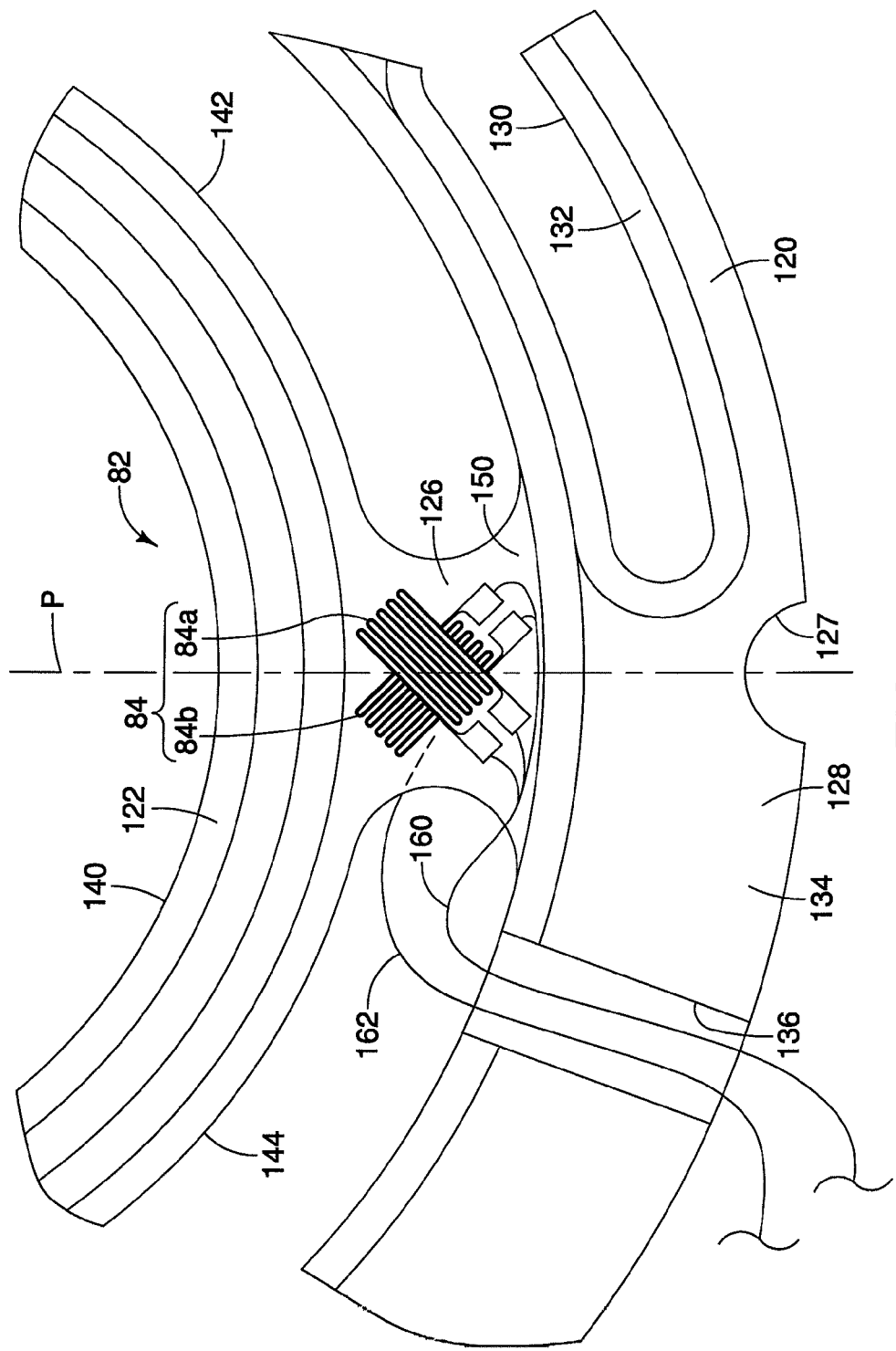
FIG. 16 is another enlarged outer end view of the main body of the force sensor showing details of the second joining portion of the main body and the arrangement of the strain gauges in accordance with the present invention.
Figure 17:
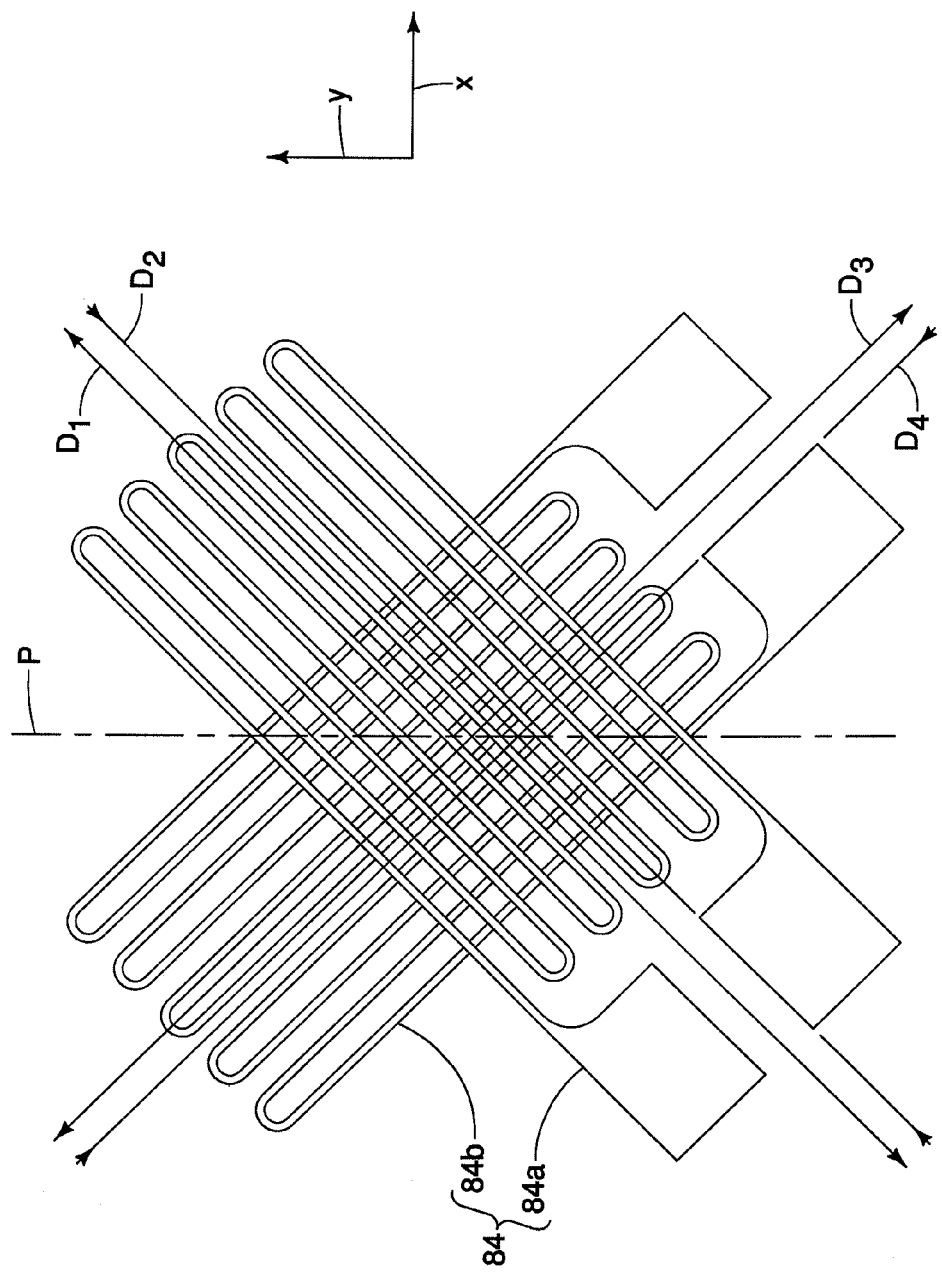
FIG. 17 is a force diagram that shows the strain gauges with arrows indicating directions of strain detection in accordance with the present invention.

As best shown in FIG. 16, the second joining portion 126 has first and second circumferential sides that are symmetrical to one another about the plane P, as indicated in FIG. 11. The second joining portion 126 includes a first axial end side shown in FIGS. 9 and 16, and a second axial end side shown in FIG. 7. The first axial end side of the second joining portion 126 includes a first sensor mounting surface 150 and the second axial end side of the second joining portion 126 includes a second sensor mounting surface 152. The first sensor mounting surface 150 and the second sensor mounting surface 152 extend between the outer ring 120 and the inner ring 122.

As indicated in FIGS. 2 and 3, the force sensor assembly 12 is dimensioned to threadedly attach to the right side of the bottom bracket tube 28 and is configured to receive and support the bearing ring 52, the bearing 56, the seal 60, the seal guard 64 and the O-ring seal 68. The force sensor assembly 12 also includes the seal lip 100 that is dimensioned to form a seal with and support one end of the dust tube 74.

In the depicted embodiment, the first sensor mounting surface 150 and the second sensor mounting surface 152 are oriented such that they are substantially perpendicular to the plane P and the rotation axis A. The first sensor mounting surface 150 and the second sensor mounting surface 152 are also oriented such that they are parallel to the first axial end face 128 and the second axial end face 129 of the outer ring 120. Further, the first sensor mounting surface 150 and the second sensor mounting surface 152 are substantially parallel to one another. In an alternate embodiment, the first sensor mounting surface 150 and the second sensor mounting surface 152 can be angularly offset from the first axial end face 128 and the second axial end face 129 of the outer ring 120 by up to 15 degrees.

It should be understood from the drawings and the description herein that the first and second sensor mounting surfaces 150 and 152 extend in a direction perpendicular to a rotation axis A of the crank axle 14 with the force sensor assembly 12 coupled to the bottom bracket tube 28.

As best shown in FIGS. 16 and 17, the first side strain gauge 84 includes a first gauge 84a and a second gauge 84b. Similarly, the second side strain gauge 86 includes a third gauge 86a and a fourth gauge 86b. The first side strain gauge 84 and the second side strain gauge 86 are preferably identical to one another, except that they are mounted to opposite sides of the second joining portion 126. More specifically, the first side strain gauge 84 is fixed to the first sensor mounting surface 150 and the second side strain gauge 86 is fixed to the second sensor mounting surface 152, as shown in FIGS. 2, 11, 14 and 15.

Since the first side strain gauge 84 and the second side strain gauge 86 are identical, description of one applies to both. Therefore, in the following description, only the first gauge 84a and the second gauge 84b of the first side strain gauge 84 are described in detail with respect to FIGS. 16 and 17. However, the description applies equally to the third gauge 86a and the fourth gauge 86b of the second side strain gauge 86.

The first gauge 84a and the second gauge 84b of the first side strain gauge 84 are fixed to the first sensor mounting surface 150. However, both the first gauge 84a and the second gauge 84b are angularly offset from the plane P that coincides with the rotation axis A. Since the plane P also extends along the rotational axis A of the crank axle 14 with the adaptor member installed to the bottom bracket tube 28, the first gauge 84a and the second gauge 84b are also angularly offset from the rotational axis A. Similarly, the second side strain gauge 86 is fixed to the second sensor mounting surface 152 and the third gauge 86a and the fourth gauge 86b are angularly offset from the plane P that coincides with the rotation axis A. It should further be noted that the first gauge 84a and the second gauge 84b (and the third gauge 86a and the fourth gauge 86*b*) both extend in directions that are angularly offset from the radial direction of the inner ring 122 and the outer ring 120. Here, the radial direction coincides with the plane P, as indicated in FIGS. 7 and 9.

As shown in FIG. 17, the first gauge 84*a* has first strain measurement directions $D_1$ and $D_2$. The first strain measurement directions $D_1$ and $D_2$ are substantially parallel to one another because conventional strain gauges typically only respond to strain in one direction. The first strain measurement direction $D_1$ represents a slight elongation of the first gauge 84*a* in response to forces applied to the main body 82. The first strain measurement direction $D_2$ represents a slight compression of the first strain gauge 84 in response to forces applied to the main body 82. The second gauge 84*b* has second strain measurement directions $D_3$ and $D_4$. The second measurement directions $D_3$ and $D_4$ are substantially parallel to one another because conventional strain gauges typically only respond to strain in one direction. The second strain measurement direction $D_3$ represents a slight elongation of the second gauge 84*b* in response to forces applied to the main body 82. The second strain measurement direction $D_4$ represents a slight compression of the second gauge 84*b* in response to forces applied to the main body 82.

The first gauge 84*a* and the second gauge 84*b* and their respective first and second strain measurement directions $D_1$, $D_2$, $D_3$ and $D_4$ extend in directions that are angularly offset from the radial direction of the inner ring 122 and the outer ring 120 (and the plane P) by an angle of substantially 45 degrees. Further, the second gauge 84*b* is angularly offset from the first gauge 84*a* by an angle of substantially 90 degrees. Further, the first strain measurement directions $D_1$ and $D_2$ and the second strain measurement directions $D_3$ and $D_4$ are symmetrical with respect to the plane P. In other words, the first strain measurement directions $D_1$ and $D_2$ are angularly offset from the plane P by 45 degrees in a clockwise direction as viewed in FIG. 17 and the second strain measurement directions $D_3$ and $D_4$ are angularly offset from the plane P by 45 degrees in a counterclockwise direction as viewed in FIG. 17.

The first side strain gauge 84 includes a cable 160 extending therefrom configured to carry electric signals to and from the first side strain gauge 84. The second side strain gauge 86 includes a cable 162 extending therefrom to carry electric signals to and from the second side strain gauge 86. The cables 160 and 162 each include four conductive lines or wires. Specifically as shown in FIG. 16, the cable 160 includes four wires, two of the wires being electrically connected to opposite sides of the first gauge 84*a* and two wires being connected to opposite sides of the second gauge 84*b* in a conventional manner. Similarly, the cable 162 has four wires connected in a conventional manner to the third and fourth gauges 86*a* and 86*b*. The cables 160 and 162 are laid within the recess 132 on the outer ring 120. Specifically, the cables 160 and 162 extend from the first and second side strain gauges 84 and 86, through the recess 132 and outside the force sensor assembly 12. Once the first and second side strain gauges 84 and 86 have been installed and the cables 150 and 152 are in position within the recess 136, the recess is filled in with a resin material or other similar adhesive material that retains the cables 160 and 162 in position within the recess 136.

The cover 88 is an annular member that is preferably made of an electrically insulating material that is also water resistant. The cover 88 is fixed to the main body 82 such that the cover 88 covers the first strain gauge 84, the elongated arcuate openings 142 and 144. Consequently, the cover 88 encloses and seals the force sensor assembly 12 against water and debris, thus protecting the first and second strain gauges 84 and 86 against the elements (dust, water, debris, etc).

As mentioned above, the inner ring 122 is an annular member of the main body 82 that is positioned concentrically within the outer ring 120. The inner ring 122 is rigid relative to the designed intended usage. However, the first and second joining portions 124 and 126 are dimensioned and shaped to undergo limited elastic deformation that is measurable by the first and second side strain gauges 84 and 86.

As is known in the art, properties associated with the electrical conductivity of conventional strain gauges changes in response to either elongation or compression of the strain gauge. The first and second side strain gauges 84 and 86 are fixed to the second joining portion 126 of the main body 82 of the force sensor assembly 12. The inner ring 122 of the main body 82 supports the bearing 56 and the crank axle 14 is supported by the bearing 56. Thus, forces applied to the crank axle 14 during cycling are transmitted from the crank axle 14, through the bearing 56 and to the main body 82. The first and second joining portions 124 and 126 are dimensioned to flex slightly, thereby elastically deforming. The elastic deformation of the second joining portion 126 is measured by the first and second side strain gauges 84 and 86. Hence, it is possible to measure the forces being applied to the crank axle 14 by monitoring changes in the electric properties of the first and second strain gauges 84 and 86, as described further below.

The first and second side strain gauges 84 and 86 are conventional strain gauges sometimes referred to foil strain gauges that are fixed to the desired surface using a conventional adhesive appropriate for strain gauges. However, it should be understood from the drawings and the description herein that any of a variety of strain measuring devices can be used with the present invention. Specifically, the first and second side strain gauges 84 and 86 can be replaced with other types of strain measuring devices.

The strain data measured by the first and second side strain gauges 84 and 86 is used by the control unit 32 to calculate and display torque information. Specifically, the control unit 32 calculates at least one of: the tension on the chain 38; the torque on the crank axle 14; and the power on the bicycle pedals 16. A description of those elements of the bicycle 10 that are in electrical communication with the control unit 32 and used to calculate the tension on the chain 38, torque on the crank axle 14 and/or the power on the bicycle pedals 16 is now provided with specific reference to FIG. 18. Specifically, the following elements are in electronic communication with the control unit 32: the first and second side strain gauges 84 and 86, a cadence sensor 200, an amplifier 204 and a gear positioning sensor 206.

The cadence sensor 200 is a conventional device that is typically mounted to the down tube 22, the seat tube 24 or one of the chain stays 26. The cadence sensor 200 is a device that detects the angular position of one of the right crank 44 and/or the left crank 46 and the revolutions per minute (RPM) of the crank axle 14. The cadence sensor 200 can, for example, include a magnetic field detecting device that detects magnetic fields of an adjacent one of the right crank 44 and the left crank 46 as the crank passes by the cadence sensor 200 during cycling. Further, one of the right crank 44 and the left crank 46 is provided with a magnet (not shown) that is detected by the cadence sensor 200 as the crank axle 14 rotates. The cadence sensor 200 can alternatively be any of a variety of RPM measuring devices. The cadence sensor 200 is electrically connected to the amplifier 204.

The amplifier 204 is in electrical communication with the first and second side strain gauges 84 and 86 and the cadence sensor 200. Specifically, the cables 160 and 162 of the first and second side strain gauges 84 and 86 are electrically connected to amplifier 204. The amplifier 204 is a conventional electrical component that detects changes in electrical properties of the first and second side strain gauges 84 and 86 and detects the RPM of the crank axle 14 measured by the cadence sensor 200. The amplifier 204 can be installed within the control unit 32 or can be a separate modular unit positioned adjacent to or within the force sensor assembly 12. The amplifier 204 is preferably mounted to the frame 18 adjacent to the bottom bracket tube 28. Alternatively, the amplifier 204 can be mounted within the main body 82 within one of the elongated arcuate openings 142 and 144.

The gear positioning sensor 206 is a conventional device that is installed in the front derailleur 34 and provides signals to the control unit 32 indicating the position of the bicycle chain 38 relative to plurality of chain rings of the set of chain ring 35 (FIG. 1). Each chain ring of the set of chain rings 35 has its own unique diameter. Since the gear positioning sensor 206 is a conventional device, further description is omitted for the sake of brevity.

Figure 18:
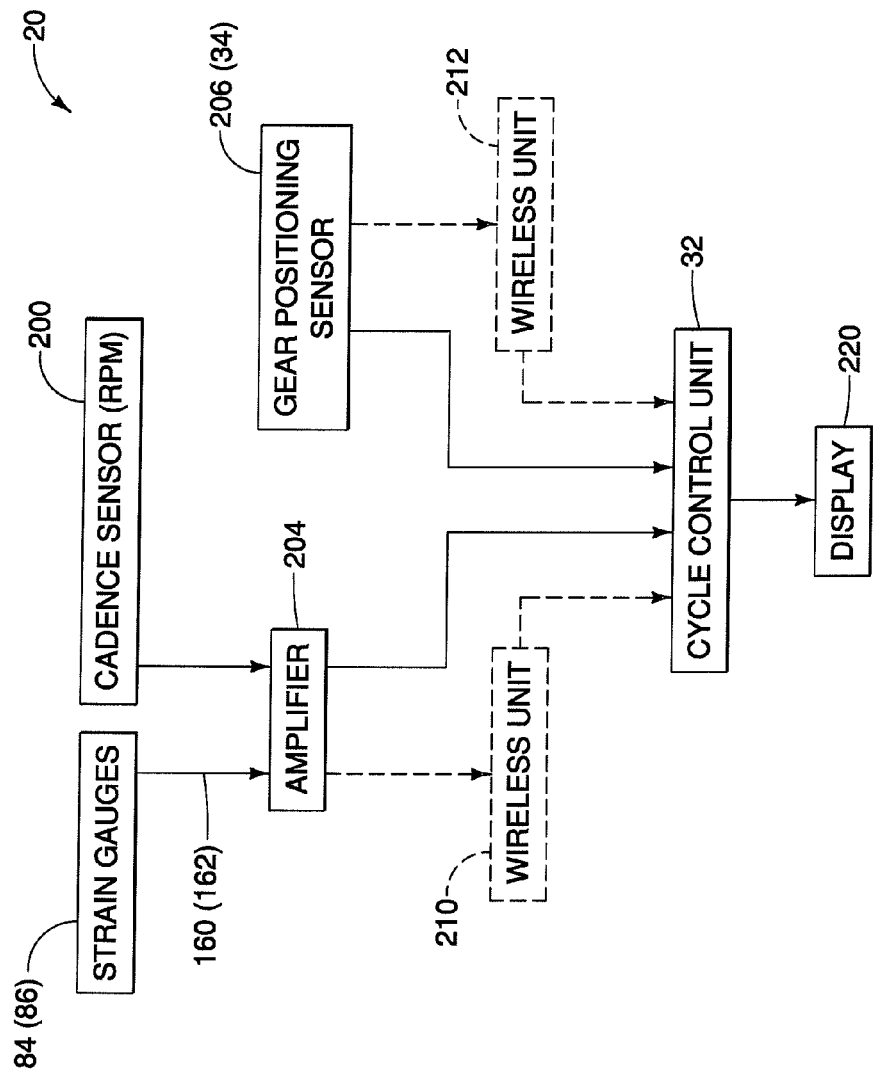
FIG. 18 is a schematic representation of the force sensor, a control unit and other bicycle equipment shown in electrical communication with one another in accordance with the present invention.

As depicted in FIG. 18, the cables 160 and 162 of the first and second side strain gauges 84 and 86 and the cadence sensor 200 are electrically connected to, or are in electrical communication with the control unit 32 via the amplifier 204. Further, the gear positioning sensor 206 is also electrically connected to the control unit 32. However, as indicated in FIG. 18, the bicycle 10 can alternatively be provided with wireless communication devices 210 and 212. Specifically, the wireless communication device 210 can provide a wireless communication link between the amplifier 204 and the control unit 32. Similarly, the wireless communication device 212 can provide a wireless communication link between the gear position sensor 206 and the control unit 32. The wireless communication device 212 can be disposed within the main body 82 within one of the elongated arcuate openings 142 and 144.

The control unit 32 is preferably a processing unit that includes a display 220 that is configured to display power data to the cyclist riding the bicycle 10. The control unit 32 is configured and arranged to receive the RPM data from the cadence sensor 200, gear position data from the gear positioning sensor 206 and force data from the first and second side strain gauges 84 and 86. The control unit 32 calculates at least one of tension on the chain 38, torque on the crank axle 14 and power per rotation on the pedals 16 produced by the cyclist in response to receiving the RPM data from the cadence sensor 200, the gear position data from the gear positioning sensor 206 and the strain data from the first and second side strain gauges 84 and 86. The control unit 32 then displays the calculated power and RPM on the display 220.

In an alternative embodiment, where the set of chain rings 35 are replaced by a single ring gear and the front derailleur 34 is eliminated, it is possible to simplify the present invention by eliminating the gear positioning sensor 206.

It should also be understood from the drawings and description herein that the display 220 can be part of the control unit 32 or can be a separate component electronically connected to the control unit 32.

The inventor tested the force sensor assembly 12 to verify that calculated chain tension determined by the control unit 32 accurately represents the actual chain tension applied to the chain 38 via the crank axle 14. The information depicted in FIGS. 19-22 demonstrates the logic used to determine the operations of the control unit 32. The control unit 32 subtracts the value of one of the first gauge 84a and the second gauge 84b from the other one of the first gauge 84a and the second gauge 84b and further subtracts the value of one of the third gauge 86a and the fourth gauge 86b from the other one of the third gauge 86a and the fourth gauge 86b. This set of calculations eliminated forces acting in a vertical direction from the overall data and provides the value of strain in the chain tension direction C. The first and second gauges 84a and 84b are connected to a conventional Wheatstone bridge circuit (not shown). Similarly, the third and fourth gauges 86a and 86b are connected to another conventional Wheatstone bridge circuit (not shown). The resulting voltage output is provided to the control unit 32 and provides the basis for the value of strain and the level of chain tension in the chain tension direction C.

Figure 19:
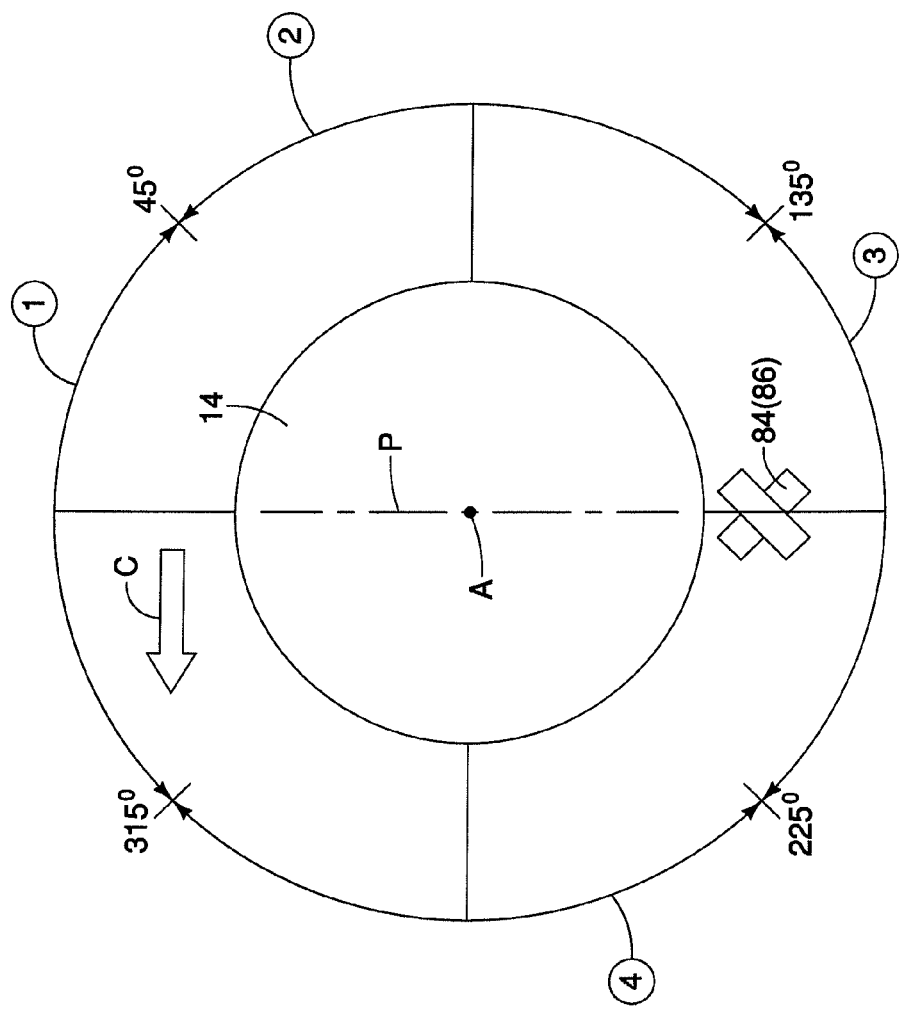
FIG. 19 is a schematic representation of the crank axle and angular locations of one of the bicycle cranks the crank and the crank axle rotate in accordance with the present invention.

FIG. 19 depicts four crank position regions and calculated crank positions corresponding to calculated positions of the right crank 44. Specifically, the number one (1) represents a 90 degrees angular region of a rotation of the crank axle 14. In other words, the number one (1) represents the position of the right crank 44 in a corresponding angular position relative to the rotation axis A. The number two (2) represents a second 90 degree angular region of one rotation of the crank axle 14. Hence, the number two (2) represents the position of the right crank 44 in a corresponding angular position relative to the rotation axis A. The number three (3) represents a third 90 degree angular region of one rotation of the crank axle 14. Hence, the number two (2) represents the position of the right crank 44 in a corresponding angular position relative to the rotation axis A. Finally, the number four (4) represents a fourth 90 degree angular region of one rotation of the crank axle 14. Hence, the number two (2) represents the position of the right crank 44 in a corresponding angular position relative to the rotation axis A.

The strain at each of the four crank position regions is measured by the first and second side strain gauges 84 and 86. The actual position of the crank axle 14 relative to the rotation axis A is determined by signals from the cadence sensor 200. Since the cadence sensor 200 also provides predetermined crank position data and RPM data, some crank positions are easily determined. For example, with a sampling frequency $F_1$ measured in Hz (hertz) and a time $T_1$ seconds per rotation of the crank axle 14, then by dividing $F_1$ by T1 ($F_1/T_1$) the crank positions are obtained.

Figure 20:
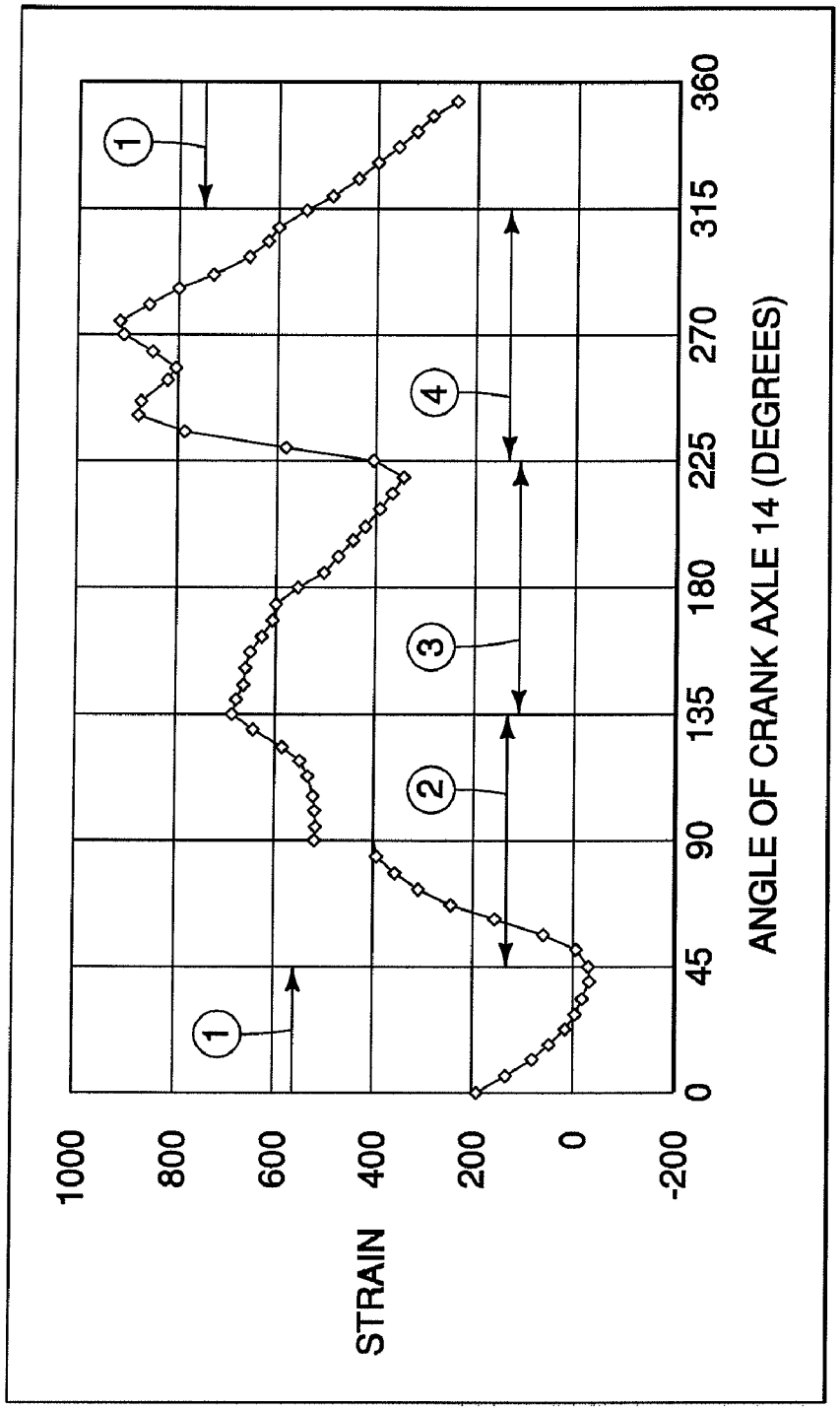
FIG. 20 is a chart showing measured strain corresponding to data collected from the strain gauges with the crank and crank axle at the angular locations represented in FIG. 19 in accordance with the present invention.

FIG. 20 represents strain measured by the first and second side strain gauges 84 and 86 (outboard and inboard side strain gauges) in a single rotation of the crank axle 14, with the four crank position regions one (1), two (2), three (3) and four (4). As can be seen in FIG. 20, the strain measured changes depending upon the position of the crank. Specifically, the first and second side strain gauges 84 and 86 have differing responses depending upon the chain tension. The control unit 32 utilizes signals from the cadence sensor 200 to determine the actual rotational location of the crank axle 14 and crank 44 (46) and can therefore correlate detected average strain to each of the four crank position regions. The control unit 32 is programmed and/or configured to take the strain variations in all crank position regions into account using compensating constants that are discussed further below.

Figure 21:
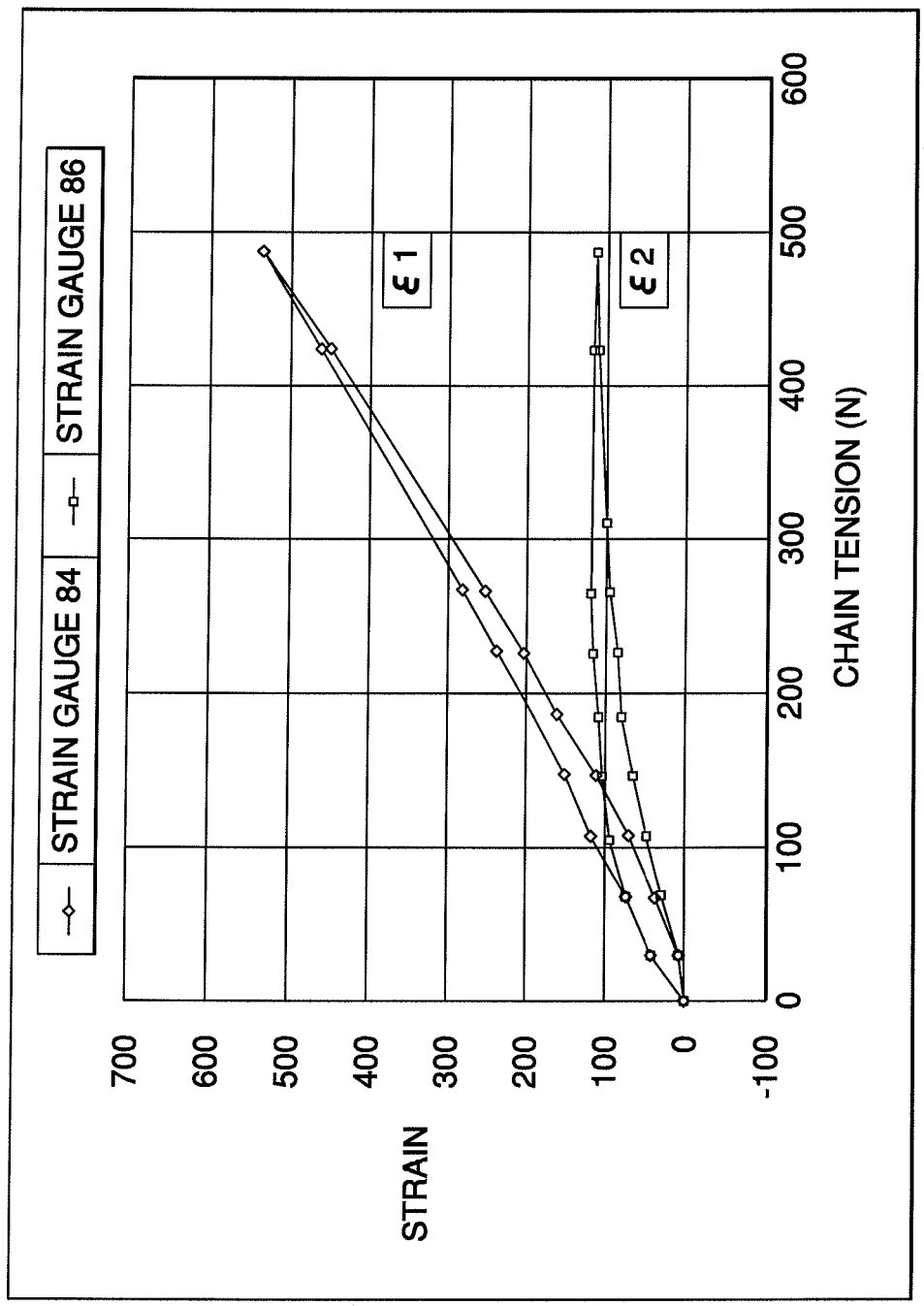
FIG. 21 is a chart showing strain measured from each of the two strain gauges showing that the two strain gauges have differing levels of strain in accordance with the present invention.

As shown in FIG. 21, chain tension (N) was measured independently and separately from the strain detected by the first and second side strain gauges 84 and 86. Specifically, known amounts of chain tension (N) were applied to the crank axle 14 and strain was measured using the first and second side strain gauges 84 and 86. The outboard strain readings from the first side strain gauge 84 (the first gauge 84a and the second gauge 84b) was greater at larger chain tension amounts that inboard strain readings from the second side strain gauge 86 (the third gauge 86a and the fourth gauge 86b). These measurements are represented in FIG. 21. A hysteresis effect is noticeable at differing levels of chain tension (N) and the detected strain due in part because of the effects of strain measured at all crank positions represented in FIG. 20. By mathematically combining (or averaging) the signals from the first and second side strain gauges 84 and 86, the control unit 32 can compensate for this hysteresis effect.

Figure 22:
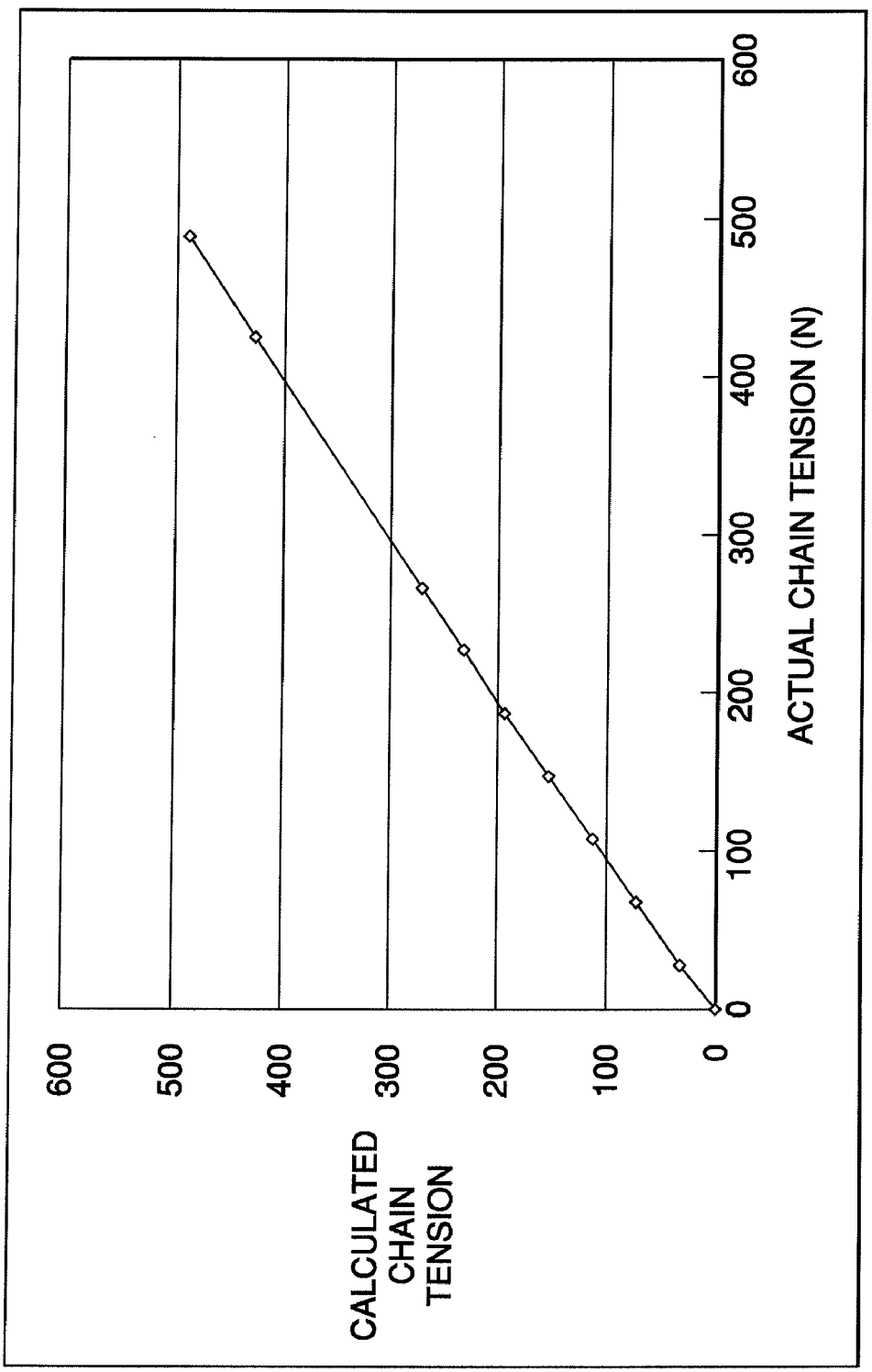
FIG. 22 is a chart showing actual chain tension corresponding to torque applied to the crank axle and calculated chain tension that was determined utilizing strain measurements from the two strain gauges and pre-determined constants to account for hysteresis shown in the chart of FIG. 21 in accordance with the present invention.

FIG. 22 shows measured chain tension (N) and calculated chain tension calculated using the signals from the first and second side strain gauges 84 and 86, the gear positioning sensor 206 and the compensating constants. As can be seen in FIG. 22, the calculated chain tension is linear with the real or separately measured chain tension (N). Hence, the control unit 32 can use the signals from the first and second side strain gauges 84 and 86 and the gear positioning sensor 206 (34) accurately calculate and display the torque being applied to the chain by a cyclist pedaling on the bicycle 10.

When the control unit 32 calculates the power, the gear positioning sensor 206 provides information on the chain location relative to the front sprockets. The relative diameter of each chain ring of the set of chain rings 35 is stored in memory within the control unit 32. Hence, the distance between the rotation axis A and teeth of each chain ring of the set of chain rings 35 is easily determined by the control unit 32.

The control unit 32 is programmed to include the above mentioned compensating constants using the following formula:

$$Fc = [a_1 \quad a_2 \quad \ldots \quad a_9] \cdot \begin{bmatrix} X_1 \\ X_2 \\ \vdots \\ \vdots \\ X_8 \\ 1 \end{bmatrix}$$

where:
Fc is the calculated chain tension;
$X_1, X_2, X_3$ & $X_4$ are average strain measurements from the first side strain gauge 84 at the four crank position regions one (1), two (2), three (3) and four (4);
$X_5, X_6, X_7$ & $X_8$ are average strain measurements from the second side strain gauge 86 at the four crank position regions one (1), two (2), three (3) and four (4);
1 is included in the above matrix to compensate the value of strain;
$a_1, a_2, a_3$ & $a_4$ are compensation constants determined for each of the four crank position regions one (1), two (2), three (3) and four (4) for measurements from the first side strain gauge 84; and
$a_5, a_6, a_7$ & $a_8$ are compensation constants determined for each of the four crank position regions one (1), two (2), three (3) and four (4) for measurements from the second side strain gauge 86; and
$a_9$ is a compensation constant determined per rotation.

The sensitivity of the first and second side strain gauges 84 and 86 differs at the four crank position regions one (1), two (2), three (3) and four (4). By processing corresponding strain data at each of the four crank position regions one (1), two (2), three (3) and four (4), a more consistent and reliable calculated chain tension is provided by the control unit 32. Further, using the compensation constants $a_1$ through $a_8$ eliminates the different levels of sensitivity between the first and second side strain gauges 84 and 86 at differing crank angles. Furthermore, using the average strain measurements $X_1, X_2, X_3$ & $X_4$ from the first side strain gauge 84 and the average strain measurements $X_5, X_6, X_7$ & $X_8$ from the second side strain gauge 86 can eliminate the hysteresis effects demonstrated in the chart of FIG. 21.

constants $a_9$ and 1 in the above equation compensate for rotation when there is no tension on the chain (no torque) even though under such circumstances strain is measured. The inventors determined the compensation constants $a_1$~$a_9$ through experimentation.

The control unit 32 can calculate the power using the following formula:

$$P = Fc \cdot Vc$$

where:
Vc is chain speed $$Vc = \omega \cdot Gr$$

where:
$\omega$ is rotation speed (calculated based on signal from the cadence sensor 200)
Gr is the semidiameter of active chain ring of the set of chain rings 35 (based on signal from the gear positioning sensor 206)

The control unit 32 can calculate the torque using the following formula:

$$P = T \cdot \omega$$

where:
T is average torque of per rotation

With the above described configuration of the force sensor assembly 12, elastic deformation of the first and second joining portions 124 and 126 allows for accurate strain measurements. The configuration of the force sensor assembly 12 allows for easy installation to both new and previously used bicycles. The configuration of the force sensor assembly 12 allows for an increase in strain measurement sensitivity and allows for an accurate calculation of chain tension, pedaling power and crank axle torque.

Further, the configuration of the force sensor assembly 12 allows for the adjustment of the vertical positioning of the main body 82. Hence, the first and second joining portions 124 and 126 can be oriented vertically one above the other. Thus, it is possible to cancel forces in a vertical direction (y-direction in FIG. 17) in order to obtain only forces in the chain tension direction C (x-direction in FIG. 18).

Consequently, it is preferable to have the first and second joining portions 124 and 126 oriented vertically one above the other. The vertical alignment of the first and second joining portions 124 and 126 is possible with the force sensor assembly 12 by the inclusion of the arcuate elongated openings 130 in the outer ring 120 of the main body 82. Loosening the fasteners F allows for angular positioning of the main body 82 relative to the adaptor member 80 and the frame 18 of the bicycle 10.

It should be understood from the drawings and description herein, that when the angular position of the main body 82 is adjusted relative to the adaptor member 80, the plurality of recesses 127 can be aligned to correspond to the location of the plurality of recesses 108 of the adaptor member 80. However, it is not required for the plurality of recesses 127 of the main body 82 to be aligned to correspond to the location of the plurality of recesses 108 of the adaptor member 80

Alternate Embodiments

In the above described embodiment, the front derailleur 34 and the rear derailleur 36 are manually shifted between chain rings by the cyclist in a conventional manner. However, it should be understood from the drawings and the description herein that the force sensor assembly 12 can also be employed on a bicycle with an automatic gear shifting system. Further, the calculated chain tension (crank axle torque) and power can be used by a modified control unit to determine optimal shifting speeds based upon the chain tension and current gear speed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

The control unit 32 preferably includes a microcomputer with a bicycle control program that controls the display 220 and performs calculations based upon data input. The control unit 32 can also include other conventional components such as an input interface circuit, an output interface circuit, and storage devices such as a ROM (Read Only Memory) device and a RAM (Random Access Memory) device. The microcomputer of the control unit 32 is programmed to control the display 220 but can alternatively also be programmed to control automated shifting of the chain position. The memory circuit stores processing results and control programs such as ones for derailleur positioning operations that are run by the processor circuit. The internal RAM of the control unit 32 stores statuses of operational flags and various control data. It will be apparent to those skilled in the art from this disclosure that the precise structure and algorithms for control unit 32 can be any combination of hardware and software that will carry out the functions of the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle bottom bracket force sensor, comprising:
    an outer portion;
    an inner portion dimensioned to receive and support a crank axle bearing that rotatably supports a crank axle rotatable about an axis of rotation, the inner portion being positioned radially inward relative to the outer portion;
    a first joining portion extending between the outer portion and the inner portion;
    a second joining portion extending in a radial direction from the outer portion to the inner portion with a first opening separating a first section of the outer portion from a first section of the inner portion, and a second opening separating a second section of the outer portion from a second section of the inner portion, the second joining portion being located between the first opening and the second opening; and
    at least one sensor mounting surface extending between the outer portion and the inner portion along the second joining portion, the sensor mounting surface having a strain gauge fixed thereto, the sensor mounting surface extending in a direction substantially perpendicular to a rotation axis of the crank axle when the force sensor is coupled to the bicycle bottom bracket.

2. The bicycle bottom bracket force sensor according to claim 1, further comprising:
    an adaptor member removably mountable to the outboard side of the bicycle bottom bracket and coupled to the outer portion.

3. The bicycle bottom bracket force sensor according to claim 2, wherein
    the outer portion is angularly adjustably coupled to the adaptor member.

4. The bicycle bottom bracket force sensor according to claim 1, wherein the outer portion includes an annular shaped outer ring and the inner portion includes an annular shaped inner ring radially spaced apart from the outer portion with an inner radial surface of the inner ring being dimensioned and configured to support the crank axle bearing.

5. The bicycle bottom bracket force sensor according to claim 4, wherein the first joining portion and the second joining portion are circumferentially spaced apart from one another.

6. The bicycle bottom bracket force sensor according to claim 1, wherein the strain gauge has a strain measurement direction that is angularly offset from a plane that extends along the rotation axis of the crank axle, coincides with the rotation axis and extends through the strain gauge.

7. The bicycle bottom bracket force sensor according to claim 1, wherein the strain gauge includes first strain gauge that has a first strain measurement direction and a second strain gauge has a second strain measurement direction and at least one of the first and second strain measurement directions is angularly offset from a plane that extends along the rotation axis of the crank axle, coincides with the rotation axis of the crank axle and extends through the first and second strain gauges.

8. The bicycle bottom bracket force sensor according to claim 7, wherein the other of the first and second strain measurement directions is angularly offset from the one of the first and second strain measurement directions by an angle of substantially 90 degree.

9. The bicycle bottom bracket force sensor according to claim 1, wherein the strain gauge comprises a first side strain gauge and a second side strain gauge, the first side strain gauge being disposed on a first axial side of the second joining portion and the second side strain gage being disposed on a second axial side of the second joining portion.

10. The bicycle bottom bracket force sensor according to claim 9, wherein each of the first side strain gauge and the second side strain gauge includes first strain gauge that has a first strain measurement direction and a second strain gauge has a second strain measurement direction and at least one of the first and second strain measurement directions is angularly offset from a plane that extends along the rotation axis of the crank axle, coincides with the rotation axis of the crank axle and extends through the first and second strain gauges.

11. The bicycle bottom bracket force sensor according to claim 10, wherein one of the first and second strain measurement directions is angularly offset by an angle of substantially 45 degrees with respect to the plane that coincides with and extends along the rotation axis crank axle.

12. The bicycle bottom bracket force sensor according to claim 1, wherein
the first opening has an arcuate shape and the second opening has an arcuate shape.

13. The bicycle bottom bracket force sensor according to claim 1, wherein
the first opening extends between a first side of the first joining portion and a first side of the second joining portion and the second opening extends between a second side of the first joining portion and a second side of the second joining portion.

14. The bicycle bottom bracket force sensor according to claim 1, wherein
the first joining portion and the second joining portions are asymmetrically shaped relative to one another.

15. The bicycle bottom bracket force sensor according to claim 1, wherein
the first opening extends in a circumferential direction relative to the axis of rotation and the second opening extends in a circumferential direction relative to the axis of rotation.

16. A bicycle bottom bracket force sensor comprising:
an outer portion;
an inner portion dimensioned to receive and support a crank axle bearing that rotatably supports a crank axle; and
at least one sensor mounting surface extending between the outer portion and the inner portion having a strain gauge fixed thereto, the sensor mounting surface extending in a direction substantially perpendicular to a rotation axis of the crank axle when the force sensor is coupled to the bicycle bottom bracket, the strain gauge including a first strain gauge having a first strain measurement direction, and a second strain gauge having a second strain measurement direction, at least one of the first and second strain measurement directions is angularly offset from a plane that extends along the rotation axis of the crank axle, coincides with the rotation axis of the crank axle and extends through the first and second strain gauges,
wherein the one of the first and second strain measurement directions is angularly offset from the plane by an angle of substantially 45 degrees.

17. A bicycle bottom bracket force sensor comprising:
an outer portion;
an inner portion dimensioned to receive and support a crank axle bearing that rotatably supports a crank axle; and
at least one sensor mounting surface extending between the outer portion and the inner portion having a strain gauge fixed thereto, the sensor mounting surface extending in a direction substantially perpendicular to a rotation axis of the crank axle when the force sensor is coupled to the bicycle bottom bracket,
wherein the strain gauge includes a first strain gauge having a first strain measurement direction and a second strain gauge having a second strain measurement direction, the first strain measurement direction and the second strain measurement direction being angularly offset from one another defining an X-shape when viewed in a direction of the rotation axis.

18. The bicycle bottom bracket force sensor according to claim 17, wherein the first and second strain measurement directions are angularly offset from each other by an angle of substantially 90 degrees.

* * * * *